United States Patent
Nishimura

(10) Patent No.: US 9,430,285 B2
(45) Date of Patent: Aug. 30, 2016

(54) DIVIDING AND PARALLEL PROCESSING RECORD SETS USING A PLURALITY OF SUB-TASKS EXECUTING ACROSS DIFFERENT COMPUTERS

(71) Applicant: NEC Corporation, Minato-ku, Tokyo (JP)

(72) Inventor: Shoji Nishimura, Tokyo (JP)

(73) Assignee: NEC CORPORATION, Tokyo (JP)

( * ) Notice: Subject to any disclaimer, the term of this patent is extended or adjusted under 35 U.S.C. 154(b) by 0 days.

(21) Appl. No.: 14/438,745

(22) PCT Filed: Oct. 29, 2013

(86) PCT No.: PCT/JP2013/006380
§ 371 (c)(1),
(2) Date: Apr. 27, 2015

(87) PCT Pub. No.: WO2014/068950
PCT Pub. Date: May 8, 2014

(65) Prior Publication Data
US 2015/0254105 A1 Sep. 10, 2015

(30) Foreign Application Priority Data
Oct. 31, 2012 (JP) .................... 2012-239782

(51) Int. Cl.
*G06F 9/48* (2006.01)
*G06F 9/50* (2006.01)
*G06F 17/30* (2006.01)

(52) U.S. Cl.
CPC .......... *G06F 9/4881* (2013.01); *G06F 9/5088* (2013.01); *G06F 17/30* (2013.01)

(58) Field of Classification Search
None
See application file for complete search history.

(56) References Cited

U.S. PATENT DOCUMENTS 8,260,803 B2 * 9/2012 Hsu .................. G06F 17/30516
707/769
2002/0198872 A1 * 12/2002 MacNicol ......... G06F 17/30445
(Continued)

FOREIGN PATENT DOCUMENTS

| JP | 07-111718 B2 | 5/1991 |
| JP | 2009080583 A | 4/2009 |

(Continued)

OTHER PUBLICATIONS

International Search Report for PCT Application No. PCT/JP2013/006380, mailed on Jan. 28, 2014.
(Continued)

*Primary Examiner* — Benjamin Wu

(57) ABSTRACT

Disclosed are a data processing system, etc., whereby total processing time of a data process including a parallel process and a serial process is optimized. This data processing system comprises: a task segmenting means for receiving a plurality of tasks which execute, upon a record set which is a set of a plurality of records, a data process which includes parallel processes which a plurality of computers are capable of executing in parallel and serial processes which are post-processes of the parallel processes and is executed by one computer, and, for a parallel process which is the pre-process of a serial process, among the serial processes which are included in the task, which is envisioned as requiring more time to process than another serial process, by subdividing the record set which is to be processed in the parallel process, segmenting the parallel process into a plurality of sub-tasks; and an assignment means for assigning the plurality of sub-tasks to the plurality of computers, such that the plurality of sub-tasks are executed prior to a task other than the task which includes the parallel processes being executed.

8 Claims, 30 Drawing Sheets

(56) References Cited

U.S. PATENT DOCUMENTS

| | | | | |
|---|---|---|---|---|
| 2008/0270403 | A1* | 10/2008 | Bookman | G06F 8/51 |
| 2009/0254916 | A1* | 10/2009 | Bose | G06F 17/30477 718/104 |
| 2009/0271596 | A1* | 10/2009 | Barsness | G06F 11/3495 712/229 |
| 2009/0327444 | A1* | 12/2009 | Archer | G06F 15/17343 709/212 |
| 2010/0228760 | A1* | 9/2010 | Chen | G06F 17/30445 707/759 |
| 2011/0179100 | A1* | 7/2011 | Kawai | H04L 29/08135 709/201 |
| 2011/0302583 | A1* | 12/2011 | Abadi | G06F 17/30545 718/102 |
| 2012/0078975 | A1* | 3/2012 | Chen | G06F 17/30516 707/803 |
| 2012/0167103 | A1* | 6/2012 | Kim | G06F 9/5027 718/102 |
| 2013/0275452 | A1* | 10/2013 | Krishnamurthy | G06F 17/30516 707/764 |
| 2013/0346988 | A1* | 12/2013 | Bruno | G06F 9/5066 718/102 |
| 2014/0019694 | A1* | 1/2014 | Gulley | G06F 21/64 711/154 |

FOREIGN PATENT DOCUMENTS

| | | |
|---|---|---|
| JP | 2011180725 A | 9/2011 |
| WO | 2012023175 A1 | 2/2012 |

OTHER PUBLICATIONS

English Translation of write opinion for PCT Application No. PCT/JP2013/006380.

* cited by examiner

Fig. 10
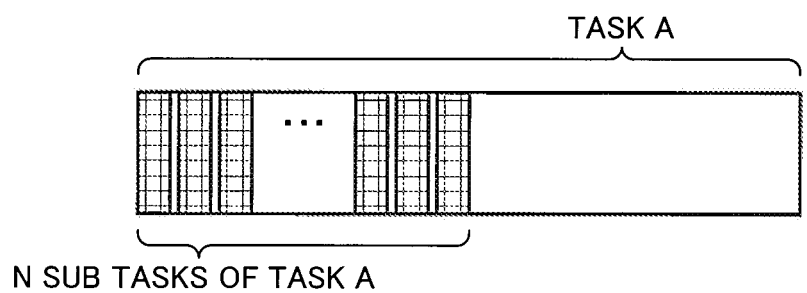
N SUB TASKS OF TASK A
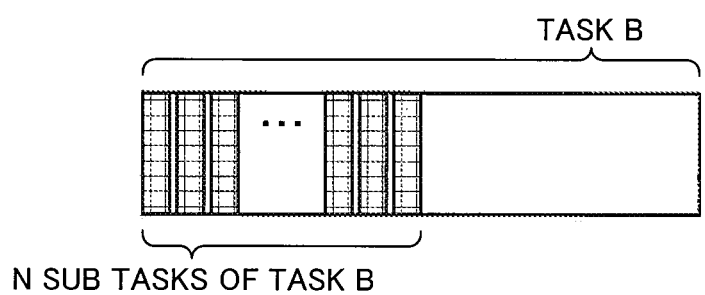
N SUB TASKS OF TASK B
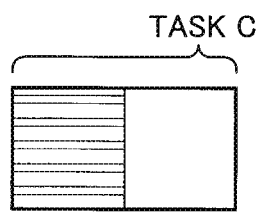

TRANSACTION TABLE

| RECORD ID | BRANCH OFFICE NAME | CUSTOMER ID | TRANSACTION TIME |
|---|---|---|---|
| 1 | TOKYO BRANCH OFFICE | 16903 | 9:01:07 |
| 2 | TOKYO BRANCH OFFICE | 38455 | 9:23:07 |
| 3 | TOKYO BRANCH OFFICE | 37339 | 9:25:42 |
| ... | ... | ... | ... |
| 200 | TOKYO BRANCH OFFICE | 43448 | 16:59:56 |
| 201 | SAPPORO BRANCH OFFICE | 41125 | 9:12:33 |
| 202 | SAPPORO BRANCH OFFICE | 47189 | 9:42:07 |
| ... | ... | ... | ... |
| 250 | SAPPORO BRANCH OFFICE | 19668 | 16:49:47 |
| 251 | SENDAI BRANCH OFFICE | 82444 | 9:10:15 |
| ... | ... | ... | ... |
| 600 | FUKUOKA BRANCH OFFICE | 11193 | 16:53:51 |

RECORD SET { (records 1-200)
RECORD SET { (records 201-250)

Fig. 20

| BRANCH OFFICE NAME | NUMBER OF RECORDS |
|---|---|
| TOKYO BRANCH OFFICE | 200 |
| SAPPORO BRANCH OFFICE | 100 |
| SENDAI BRANCH OFFICE | 100 |
| YOKOHAMA BRANCH OFFICE | 50 |
| OSAKA BRANCH OFFICE | 50 |
| KYOTO BRANCH OFFICE | 25 |
| KOBE BRANCH OFFICE | 25 |
| HIROSHIMA BRANCH OFFICE | 25 |
| FUKUOKA BRANCH OFFICE | 52 |

Fig. 28

| TASK ID | ASSIGNMENT DESTINATION ID | PROCESSING TARGET RECORD | PRIORITY | TASK TYPE | AGGREGATION DESTINATION TASK ID |
|---|---|---|---|---|---|
| A-1 | 200A | 1~50 | 0 | Parallelized | A-S |
| A-2 | 200B | 51~100 | 0 | Parallelized | A-S |
| A-3 | 200C | 101~150 | 0 | Parallelized | A-S |
| A-4 | 200D | 151~200 | 0 | Parallelized | A-S |
| A-S | 200A | 1~200 | 1 | Sequential | N/A |
| B | 200B | 201~300 | 1 | Normal | N/A |
| C | 200C | 301~400 | 1 | Normal | N/A |
| D | 200D | 401~450 | 1 | Normal | N/A |
| E | 200D | 451~500 | 2 | Normal | N/A |
| F | 200A | 501~525 | 2 | Normal | N/A |
| G | 200B | 526~550 | 2 | Normal | N/A |
| H | 200C | 551~575 | 2 | Normal | N/A |
| I | 200D | 576~600 | 3 | Normal | N/A |

Fig. 31

| TASK ID | ASSIGNMENT DESTINATION ID | PROCESSING TARGET RECORD | PRIORITY | TASK TYPE | AGGREGATION DESTINATION TASK ID | PROGRESS |
|---|---|---|---|---|---|---|
| A-1 | 200A | 1~50 | 0 | Parallelized | A-S | EXECUTED |
| A-2 | 200B | 51~100 | 0 | Parallelized | A-S | EXECUTED |
| A-3 | 200C | 101~150 | 0 | Parallelized | A-S | EXECUTED |
| A-4 | 200D | 151~200 | 0 | Parallelized | A-S | EXECUTED |
| A-S | 200A | 1~200 | 1 | Sequential | N/A | EXECUTED |
| B | 200B | 201~300 | 1 | Normal | N/A | UNDER-EXECUTION |
| C | 200C | 301~400 | 1 | Normal | N/A | EXECUTED |
| D | 200D | 401~450 | 1 | Normal | N/A | EXECUTED |
| E | 200D | 451~500 | 2 | Normal | N/A | UNDER-EXECUTION |
| F | 200A | 501~525 | 2 | Normal | N/A | EXECUTED |
| G | 200B | 526~550 | 2 | Normal | N/A | NOT EXECUTED |
| H | 200C | 551~575 | 2 | Normal | N/A | UNDER-EXECUTION |
| I | 200D | 576~600 | 3 | Normal | N/A | UNDER-EXECUTION |

Fig. 35

| TYPE OF TASK | PRIORITY | TASK ID | ASSIGNMENT DESTINATION | RECORD ID | BRANCH OFFICE NAME | CUSTOMER ID | TRANSACTION TIME |
|---|---|---|---|---|---|---|---|
| 0 | 0 | A-1 | 200B | 124 | TOKYO BRANCH OFFICE | 67318 | 14:33:15 |
| 1 | 2 | H | 200C | 566 | HIROSHIMA BRANCH OFFICE | 87169 | 12:00:19 |
| 1 | 1 | B | 200B | 251 | SENDAI BRANCH OFFICE | 49471 | 9:10:15 |
| 1 | 1 | E | 200D | 497 | OSAKA BRANCH OFFICE | 76891 | 16:40:31 |
| ... | ... | ... | ... | ... | ... | ... | ... |

SHUFFLE KEY: {TYPE OF TASK, PRIORITY, TASK ID, ASSIGNMENT DESTINATION}

DIVIDING AND PARALLEL PROCESSING RECORD SETS USING A PLURALITY OF SUB-TASKS EXECUTING ACROSS DIFFERENT COMPUTERS

This application is a National Stage Entry of PCT/JP2013/006380 filed on Oct. 29, 2013, which claims priority from Japanese Patent Application 2012-239782 filed on Oct. 31, 2012, the contents of all of which are incorporated herein by reference, in their entirety.

TECHNICAL FIELD

The present invention relates to a data processing system in a decentralized processing, a data processing method, and a program.

BACKGROUND ART

In a data processing using a computer, a parallel processing technology is generally well known. Patent literature 1 discloses a technology for performing a parallel processing in which a new idea about a hash join is created. In the technology disclosed in patent literature 1, the hash join is divided into a plurality of tasks on the basis of a frequency of occurrence of a join key of a table and a plurality of the tasks are assigned to a plurality of computers. In the technology disclosed in patent literature 1, in a case in which the frequency of occurrence of the join key is biased and whereby, the processing amounts of the tasks are not uniform, the task with a large processing amount is divided into a plurality of small sub tasks. In the technology disclosed in patent literature 1, the task and the sub task are assigned to a plurality of computers so that the processing amounts of the computers are equal to each other.

CITATION LIST

Patent Literature

[PTL 1] Japanese Patent Publication No. 1995-111718

SUMMARY OF INVENTION

Technical Problem

However, the technology disclosed in patent literature 1 is only a technology for optimizing the processing time of the parallel processing. The technology disclosed in patent literature 1 has a problem in which when the technology is applied to a data processing including both a parallel processing and a serial processing, the processing time of the whole data processing is not necessarily optimized.

An object of the present invention is to provide a data processing system which can optimize the processing time of the whole data processing including the parallel processing and the serial processing.

Solution to Problem

A first invention that solves the above-mentioned problem is a data processing system including task dividing means for receiving a plurality of tasks in which a data processing including a parallel processing that can be performed by a plurality of computers in parallel and a serial processing that is a post-processing of the parallel processing and performed by one computer is performed to a record set that is a set of a plurality of records and dividing the parallel processing that is a preprocessing of the serial processing to which it is expected that the processing time thereof is greater than that of the serial processing included in another task into a plurality of sub tasks by subdividing the record set that is a processing target of the parallel processing and assignment means for assigning a plurality of the sub tasks to a plurality of the computers so that a plurality of the sub tasks are performed before the task other than the task including the parallel processing is performed.

A second invention that solves the above-mentioned problem is a data processing method including a division step in which a plurality of tasks in which a data processing including a parallel processing that can be performed by a plurality of computers in parallel and a serial processing that is a post-processing of the parallel processing and performed by one computer is performed to a record set that is a set of a plurality of records are received and the parallel processing that is a preprocessing of the serial processing to which it is expected that the processing time thereof is greater than that of the serial processing included in another task is divided into a plurality of sub tasks by subdividing the record set that is a processing target of the parallel processing and an assignment step in which a plurality of the sub tasks are assigned to a plurality of the computers so that a plurality of the sub tasks are performed before the task other than the task including the parallel processing is performed.

A third invention that solves the above-mentioned problem is a program which causes a computer to perform a division process in which a plurality of tasks in which a data processing including a parallel processing that can be performed by a plurality of computers in parallel and a serial processing that is a post-processing of the parallel processing and performed by one computer is performed to a record set that is a set of a plurality of records are received and the parallel processing that is a preprocessing of the serial processing to which it is expected that the processing time thereof is greater than that of the serial processing included in another task is divided into a plurality of sub tasks by subdividing the record set that is a processing target of the parallel processing and an assignment process in which a plurality of the sub tasks are assigned to a plurality of the computers so that a plurality of the sub tasks are performed before the task other than the task including the parallel processing is performed.

The object of the present invention can be achieved by a computer-readable storage medium storing the above-mentioned program.

Advantageous Effects of Invention

By using the present invention, the processing time of the whole data processing including the parallel processing and the serial processing can be optimized.

BRIEF DESCRIPTION OF DRAWINGS

FIG. 10 is a figure for explaining operation of a task division unit 10 according to a third exemplary embodiment of the present invention.

FIG. 20 is a figure for explaining a specific example of statistical information of the present invention.

FIG. 28 is a figure for explaining a specific example of schedule data in an eighth exemplary embodiment of the present invention.

FIG. 31 is a figure for explaining a specific example of schedule data in an eighth exemplary embodiment of the present invention.

FIG. 35 is a figure for explaining a specific example of a shuffle key in a ninth exemplary embodiment of the present invention.

DESCRIPTION OF EMBODIMENTS

Figure 1:
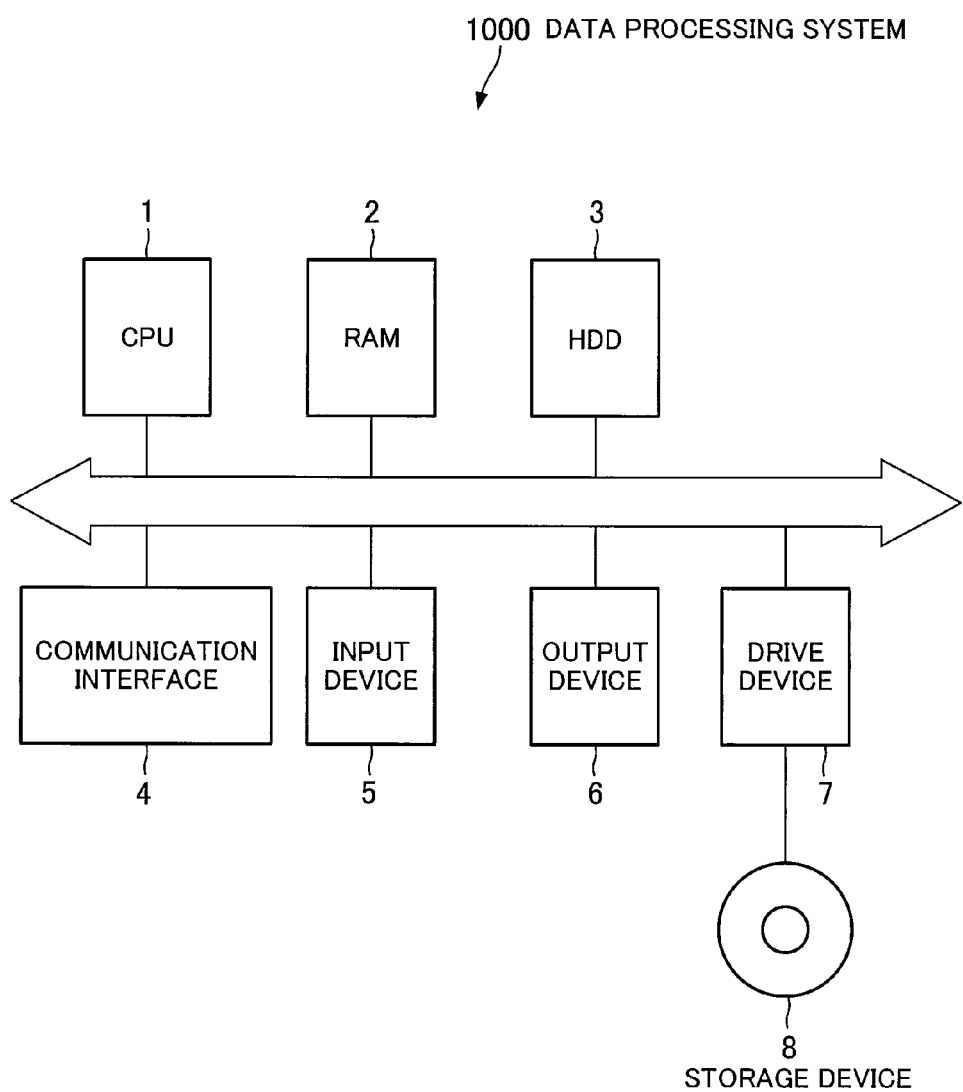
FIG. 1 is a hardware configuration diagram of a data processing system 1000 of the present invention.

The data processing that is a target of the present invention includes a parallel processing and a serial processing. The parallel processing is a process which can be performed by a plurality of computers in parallel. The serial processing is performed as a post-processing of the parallel processing.

In the parallel processing, when the number of the computers is increased, the processing time is reduced. On the other hand, the serial processing is a processing performed by one computer. Even if the number of the computers is increased, the processing time of the serial processing is not reduced. For this reason, when a plurality of computers perform the data processing including both the parallel processing and the serial processing, the processing time of the serial processing tends to become a bottleneck of the processing time of the whole data processing.

Next, a definition of terms used for explaining an exemplary embodiment of the present invention and their relations will be given below. A "table" is a data that is a target to which the data processing is performed. The table includes a plurality of record sets. A "record set" is a set of a plurality of records and a unit in which the serial processing is performed by one computer. A "job" is a data processing to the table. A "task" is a data processing to the record set. The job is divided into a plurality of tasks when the table of the processing target is subdivided into a plurality of record sets.

The task can be divided into two tasks: a parallel processable task and a serial processing task. The "parallel processable task" is a processing in which the parallel processing is performed to the record set. The "serial processing task" is a processing in which the serial processing that is the post-processing of the parallel processing is performed to the record set.

The parallel processable task can be divided into a plurality of "sub tasks" when the record set that is the processing target thereof is subdivided into a set of small records. Namely, one task can be divided into a plurality of sub tasks and one serial processing task.

"The sub task corresponds to the serial processing task" means that the sub task and the serial processing task are obtained when the same task is divided. A "large task" means a task of which the number of records included in the record set that is an execution target is large. The processing time of the task is basically determined by the number of records included in the record set that is the processing target. The large task is the task whose processing time is long.

Next, an exemplary embodiment of the present invention will be described in detail with reference to the drawing.

<First Exemplary Embodiment>

FIG. 1 is a hardware configuration diagram of a data processing system 1000 according to a first exemplary embodiment. As shown in FIG. 1, the data processing system 1000 includes for example, a CPU (Central Processing Unit) 1, a RAM (Random Access Memory) 2, a hard disk drive 3, a communication interface 4, an input device 5, an output device 6, and the like.

For example, the CPU 1 reads a program, stores it in the RAM 2, and executes it and whereby, the function of the data processing system 1000 can be realized. An application program controls the communication interface 4 by using for example, a function provided by an OS (Operating System) and whereby, transmission and reception of information by the data processing system 1000 can be realized. The input device 5 is for example a keyboard or a mouse. The output device 6 is for example, a display. Further, the input device 5 and the output device 6 may be integrated as for example, a touch panel.

Further, the present invention that is explained by using this exemplary embodiment or each exemplary embodiment described later as an example may be configured as a non-volatile storage medium 8 such as a compact disc or the like storing the program. The program stored in the storage medium 8 is read by for example, a drive device 7.

The data processing system 1000 may be configured by using two or more devices that are physically separated from each other and communicably connected by wire or wireless.

Figure 2:
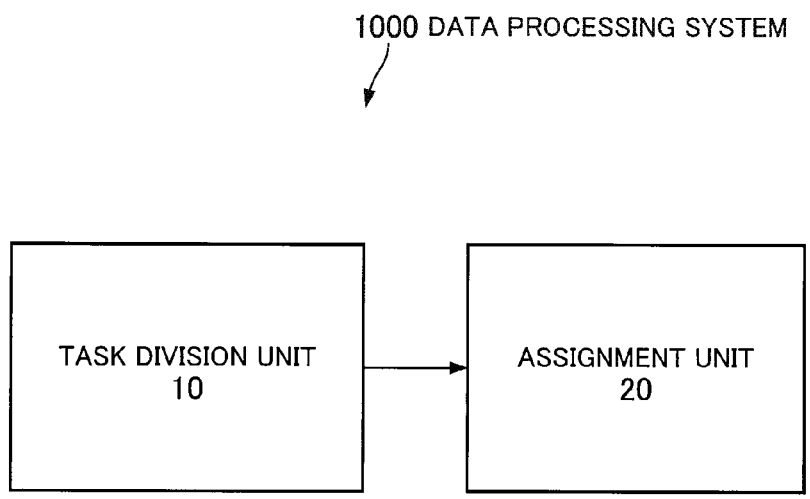
FIG. 2 is a block diagram of a data processing system 1000 according to a first exemplary embodiment of the present invention.

FIG. 2 is a block diagram of the data processing system 1000 according to the first exemplary embodiment. As shown in FIG. 2, the data processing system 1000 includes a task division unit 10 and an assignment unit 20.

In the data processing system 1000, the task division unit 10 receives a request for execution of a plurality of tasks. The task division unit 10 calculates the processing time of the serial processing task included in the task for each of a plurality of the received tasks. For example, the task division unit 10 calculates the processing time of the task on the basis of the number of the records included in the record set that is the processing target of the task. The task division unit 10 divides the parallel processable task that is the preprocessing of the serial processing task larger than another serial processing task into a plurality of sub tasks.

The assignment unit 20 assigns a plurality of the sub tasks to a plurality of computers so that a plurality of the sub tasks are performed before the task other than the task including the divided parallel processable task is performed.

Figure 3:
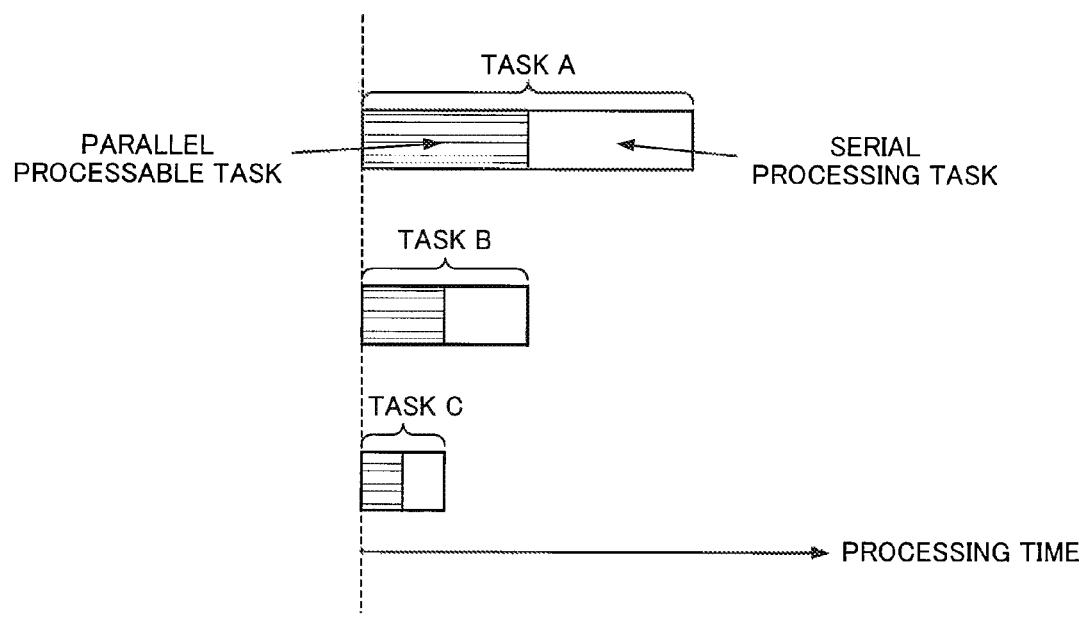
FIG. 3 is a figure for explaining a concept of a task in the present invention.

FIG. 3 is a figure for explaining a concept of a task performed by the data processing system 1000. Three rectangles are shown in FIG. 3. Each of three rectangles represents a task A, a task B, or a task C. Namely, FIG. 3 shows three tasks of the task A, the task B, and the task C. Each task includes the parallel processable task (the part with a horizontal-stripe pattern) and the serial processing task (the part filled in white). The length of the rectangle (the task) shown in FIG. 3 represents the processing time of the task when the task is performed by a single computer. It is expected that the processing time is basically proportional to the size of the record set processed by the task. As shown in FIG. 3, the serial processing task of the task A is larger than the serial processing task of the task B or the serial processing task of the task C.

Figure 4:
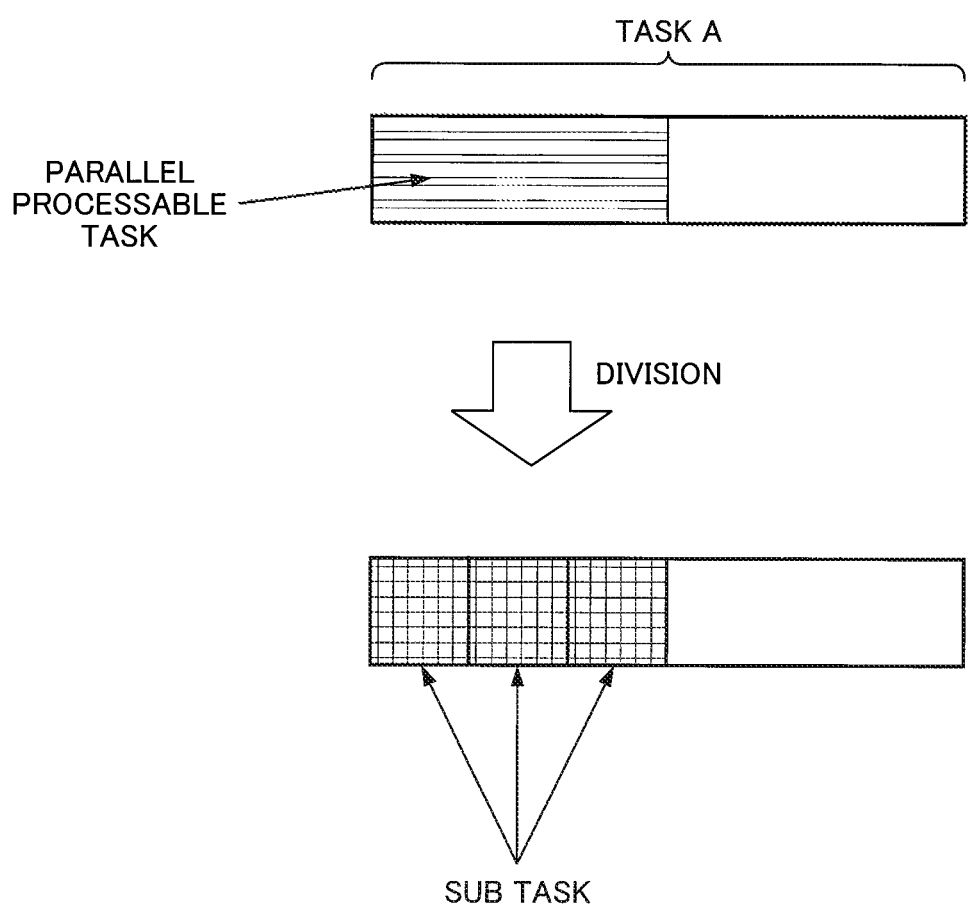
FIG. 4 is a figure for explaining a concept of a sub task in the present invention.

FIG. 4 is a figure for explaining a state in which the parallel processable task of the task A shown in FIG. 3 is divided into the sub-tasks. As shown in FIG. 4, the task division unit 10 divides the parallel processable task of the task A into a plurality of sub tasks (the part with a grid pattern). Specifically, the task division unit 10 divides the parallel processable task into the sub tasks whose number is equal to the number of the computers which perform the job. For example, when the job is performed by three computers, the task division unit 10 divides the parallel processable task of the task A into three sub tasks.

Figure 5:
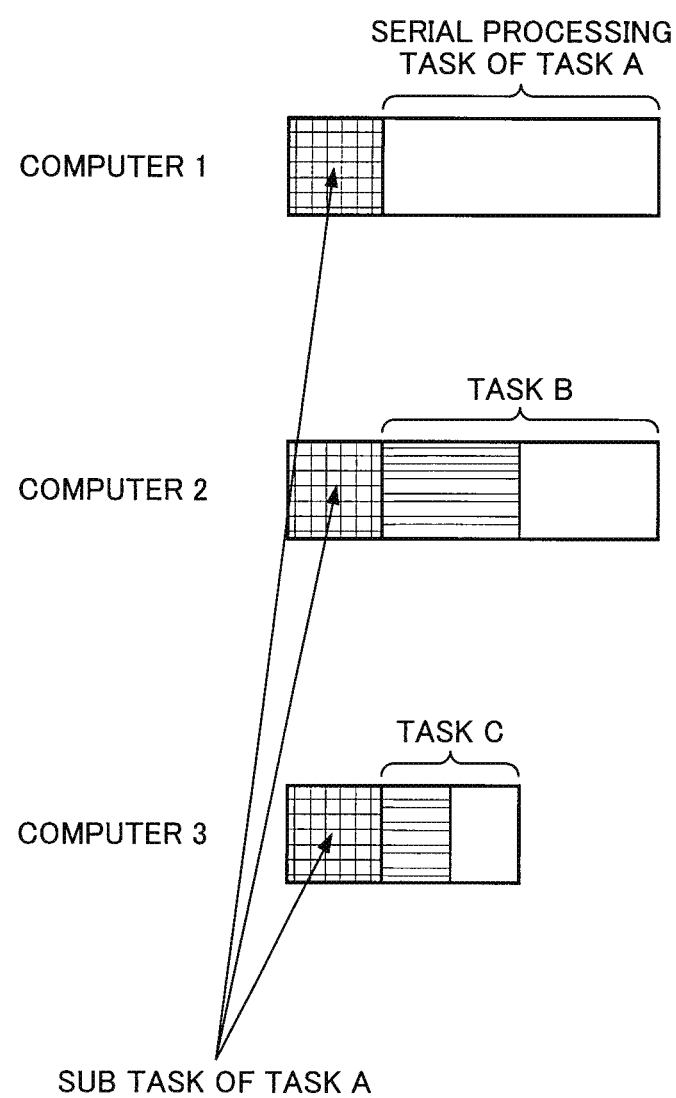
FIG. 5 is a figure for explaining a concept of a task assignment in the present invention.

FIG. 5 is a figure for explaining a state in which the task shown in FIG. 4 is assigned to three computers. As shown in FIG. 5, the assignment unit 20 assigns the sub task of the task A, the serial processing task of the task A, the task B, and the task C to three computers. The assignment unit 20 performs the assignment so that the sub task of the task A is performed before the task B and the task C are performed.

As shown in FIG. 5, the computer 1 performs the sub task of the task A and then performs the serial processing task of the task A. The computer 2 performs the sub task of the task A, transmits a result of the execution to the computer 1, and then, performs the task B. The computer 3 performs the sub task of the task A, transmits a result of the execution to the computer 1, and then, performs the task C.

Figure 6:
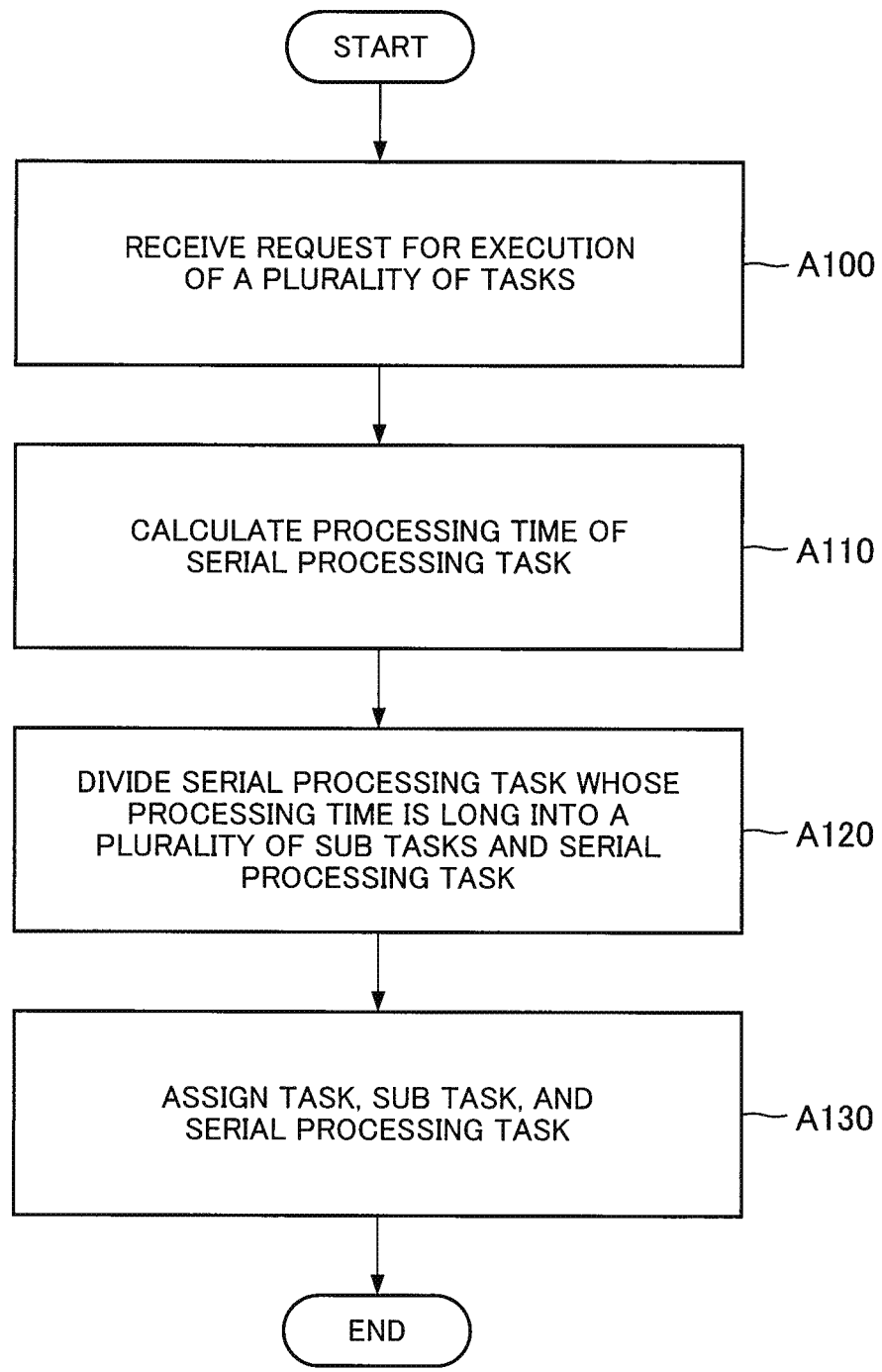
FIG. 6 is a flowchart for explaining operation of a data processing system 1000 of the present invention.

FIG. 6 is a flowchart for explaining the operation of the data processing system 1000. As shown in FIG. 6, the task division unit 10 receives a request for execution of a plurality of tasks (A100). The task division unit 10 calculates the processing time of the serial processing task included in each task on the basis of the number of the records included in the record set that is the processing target of each task for which the execution request is received (A110).

The task division unit 10 divides the task including the large serial processing task into the parallel processable task and the serial processing task and further divides the parallel processable task into a plurality of sub tasks (A120). The assignment unit 20 assigns the task, the sub task, and the serial processing task to a plurality of computers so that a plurality of sub tasks are performed before the task other than the task including the large serial processing task is performed.

As described above, the data processing system 1000 according to the exemplary embodiment can provide a data processing system which optimizes the processing time of the whole data processing including the parallel processing which can be performed by a plurality of computers in parallel and the serial processing which is the post-processing of the parallel processing and performed by one computer, a data processing method, and a program. The reason is because the data processing system 1000 schedules the execution of a job so that the large serial processing task that tends to become a bottleneck of the whole data processing is performed as soon as possible. As a result, the large serial processing task and another task are performed concurrently. Therefore, the processing time of the whole data processing can be optimized.

<Second Exemplary Embodiment>

Figure 7:
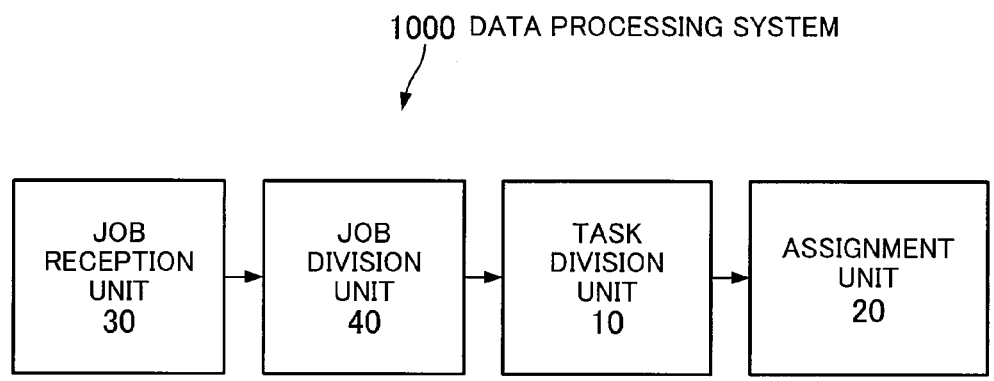
FIG. 7 is a block diagram of a data processing system 1000 according to a second exemplary embodiment of the present invention.

FIG. 7 is a block diagram of the data processing system 1000 according to a second exemplary embodiment. As shown in FIG. 7, the data processing system 1000 according to the second exemplary embodiment further includes a job reception unit 30 and a job division unit 40 in addition to the data processing system 1000 according to the first exemplary embodiment.

The job reception unit 30 receives a request for execution of the job. The job division unit 40 divides the job into a plurality of tasks by subdivides a table that is a processing target of the job into a plurality of record sets. The task division unit 10 receives a plurality of tasks from the job division unit 40 and performs the operation like the first exemplary embodiment.

Figure 8:
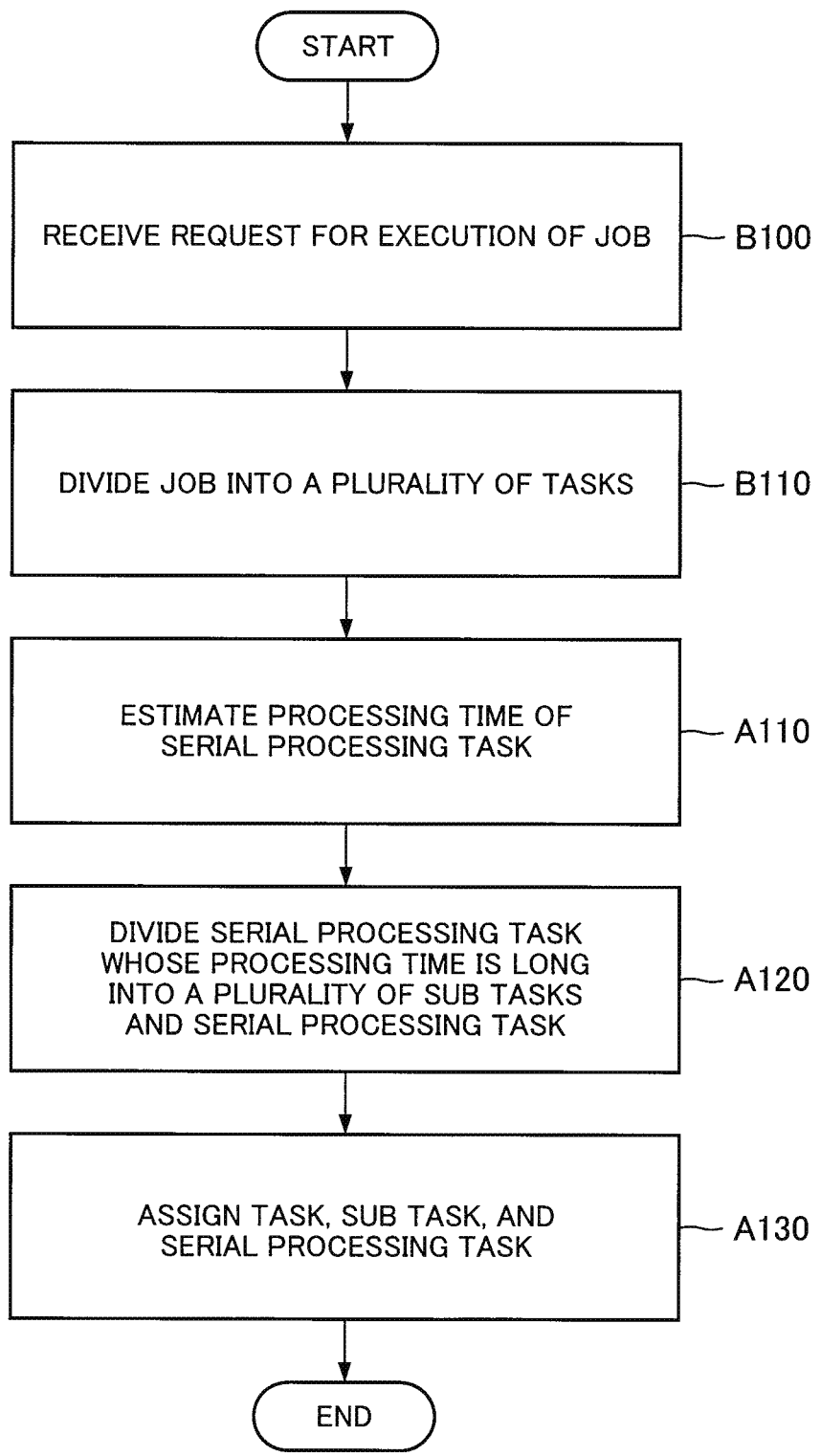
FIG. 8 is a flowchart for explaining operation of a data processing system 1000 according to a second exemplary embodiment of the present invention.

FIG. 8 is a flowchart explaining the operation of the data processing system 1000. Further, the same reference number is used for the processing shown in FIG. 8 in which the substantially same operation is performed as the processing shown in FIG. 6. As shown in FIG. 8, the job reception unit 30 receives the request for execution of the job (B100). The job division unit 40 divides the job for which the execution request is received into a plurality of tasks (B110). After this process, the processing of steps A110 to A130 is performed like the first exemplary embodiment.

As described above, the data processing system 1000 according to the exemplary embodiment can provide a data processing system which optimizes the processing time of the whole data processing including the parallel processing which can be performed by a plurality of computers in parallel and the serial processing which is the post-processing of the parallel processing and performed by one computer, a data processing method, and a program. The reason is because the data processing system 1000 schedules the execution of the job so that the large serial processing task that tends to become the bottleneck of the whole data processing is performed as soon as possible. As a result, the large serial processing task and another task are performed concurrently. Therefore, the processing time of the whole data processing can be optimized.

<Third Exemplary Embodiment>

The operation of the task division unit 10 in the data processing system 1000 according to a third exemplary embodiment is different from the operation of the task division unit 10 according to the first or second exemplary embodiment. The task division unit 10 divides the parallel processable task included in the task with respect to the task larger than the largest serial processing task. The task division unit 10 does not divide the parallel processable task included in the task with respect to the task smaller than the largest serial processing task.

Figure 9:
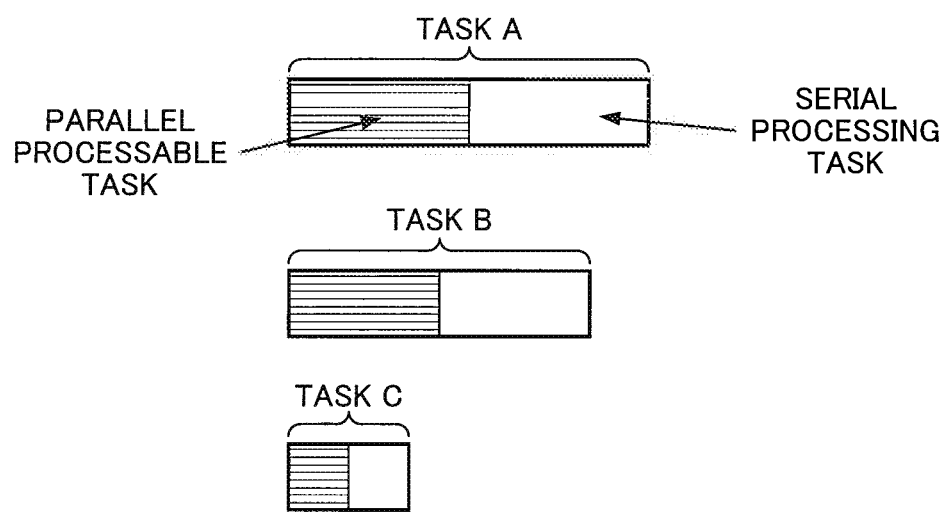
FIG. 9 is a figure for explaining operation of a task division unit 10 according to a third exemplary embodiment of the present invention.
Figure 11:
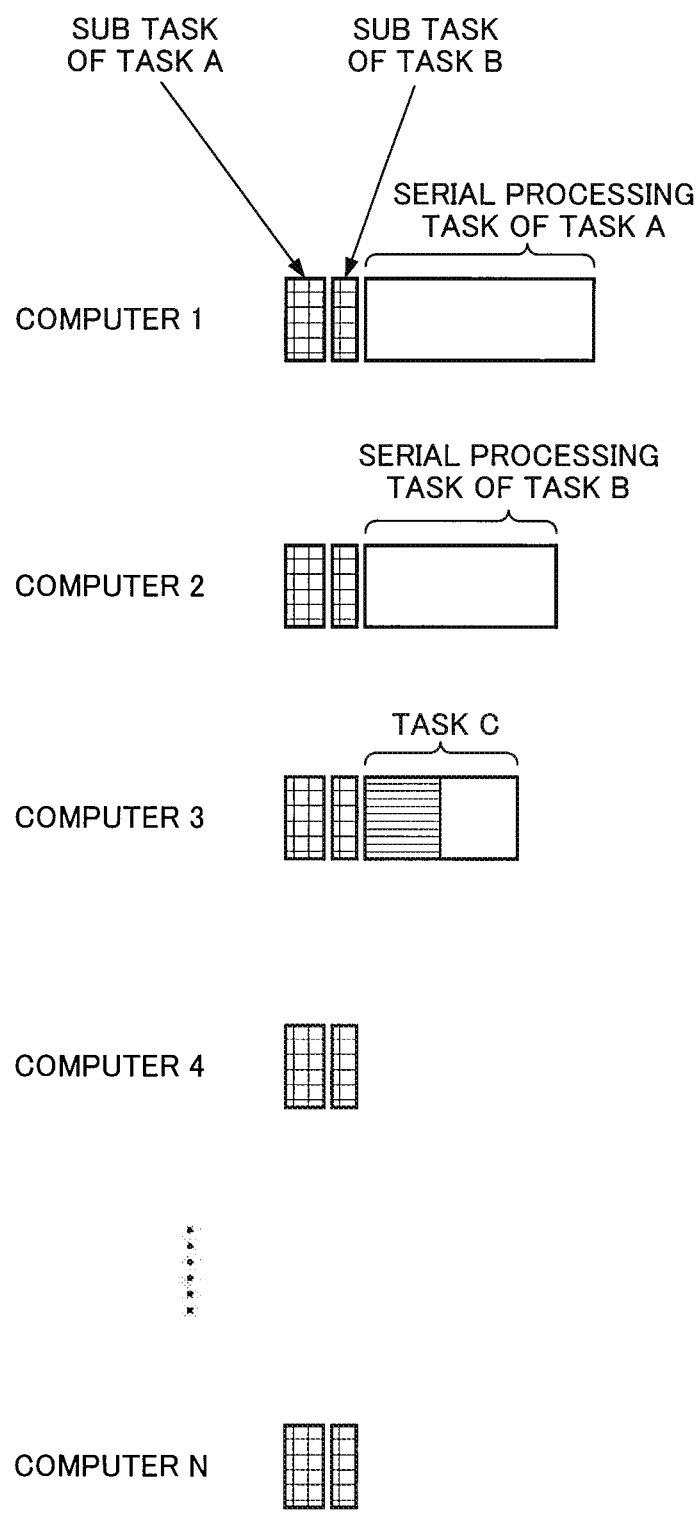
FIG. 11 is a figure for explaining operation of a task division unit 10 according to a third exemplary embodiment of the present invention.

The operation of the task division unit 10 according to the third exemplary embodiment will be described by using a case in which the job that can be divided into three tasks is performed by N computers as an example. FIG. 9, FIG. 10, and FIG. 11 are figures for explaining the operation of the task division unit 10 according to the third exemplary embodiment.

FIG. 9 shows three tasks (the task A, the task B, and the task C). As shown in FIG. 9, the largest serial processing task is the serial processing task of the task A. The task division unit 10 compares the processing times of the tasks A to C with the processing time of the serial processing task of the task A. The task A and the task B are larger than the serial processing task of the task A. Accordingly, the task division unit 10 divides the parallel processable task of the task A into N sub tasks and divides the parallel processable task of the task B into N sub tasks. On the other hand, the processing time of the task C is shorter than the processing time of the serial processing task of the task A. Therefore, the task division unit 10 does not divide the parallel processable task of the task C.

FIG. 10 is a figure for explaining a state in which the parallel processable task of the task A and the parallel processable task of the task B shown in FIG. 9 are divided into the sub tasks. As shown in FIG. 10, the parallel processable task of the task A is divided into N sub tasks and the parallel processable task of the task B is divided into N sub tasks. Hereinafter, the sub task obtained by dividing the parallel processable task of the task A is referred to as "the sub task of the task A". The sub task obtained by dividing the parallel processable task of the task B is referred to as "the sub task of the task B".

FIG. 11 is a figure showing a state in which the tasks shown in FIG. 10 are assigned to N computers. As shown in FIG. 11, an assignment unit 21 assigns the sub task of the task A, the serial processing task of the task A, the sub task of the task B, the serial processing task of the task B, and task C to a plurality of computers 1 to N.

The reason that the task division unit 10 does not divide the task C is as follows. As shown in FIG. 11, the bottleneck of the processing time of the whole job is the processing time of the serial processing task of the task A. Even when the number of computers is increased, the processing time of the serial processing task of the task A cannot be reduced. Therefore, even if the task division unit 10 performs parallelization of the task C whose processing time is shorter than that of the serial processing task of the task A, the processing time of the whole job cannot be reduced.

With respect to the task smaller than the largest serial processing task, the task division unit 10 according to the third exemplary embodiment does not divide the parallel processable task included in the task. The data processing system 1000 according to the third exemplary embodiment has such configuration. Accordingly, the unnecessary parallelization is prevented and the overhead due to unnecessary parallelization can be prevented from being generated.

Further, when the task A and the task B are larger than the serial processing task of the task A and the task A is sufficiently larger than the task B, the task division unit 10 may perform the division so that the number of the divisions of the parallel processable task of the task B is smaller than the number of the divisions of the parallel processable task of the task A. At this time, the assignment unit 20 makes a schedule so as not to assign the sub task of the task B to the computer which performs the serial processing task of the task A.

Specifically, when the total processing time of one sub task of the task A and the serial processing task of the task A is longer than the total processing time of one sub task of the task A, one sub task of the task B, and the serial processing task of the task B, the task division unit 10 sets the number of the divisions so that the number of the divisions of the parallel processable task of the task B of the task B is smaller than the number of the divisions of the parallel processable task of the task A.

For example, when the parallel processable task of the task A is divided into N sub tasks and the parallel processable task of the task B is divided into (N−1) sub tasks, the assignment unit 20 does not assign the sub task of the task B to the computer (the computer 1) which performs the serial processing task of the task A. When such schedule is made, the processing time of the serial processing task of the task A that is the bottleneck of the processing time of the whole job can be further reduced and the execution time of the whole job can be further reduced.

<Fourth Exemplary Embodiment>

The operations of the task division unit 10 and the assignment unit 20 in the data processing system 1000 according to a fourth exemplary embodiment are different from those of the task division unit 10 and the assignment unit 20 in the data processing system 1000 according to the first, second, or third exemplary embodiment. When the task division unit 10 divides the parallel processable task of the task A into a plurality of sub tasks, the task division unit 10 divides it so that the number of the records processed in each sub task is different from each other. The assignment unit 20 assigns the sub task of which the number of the records processed therein is greater than the number of the records processed in another sub task to the computer to which the serial processing task that is the post-processing of the parallel processable task is assigned. The assignment unit 20 may not assign the sub task to the computer other than this computer.

Figure 12:
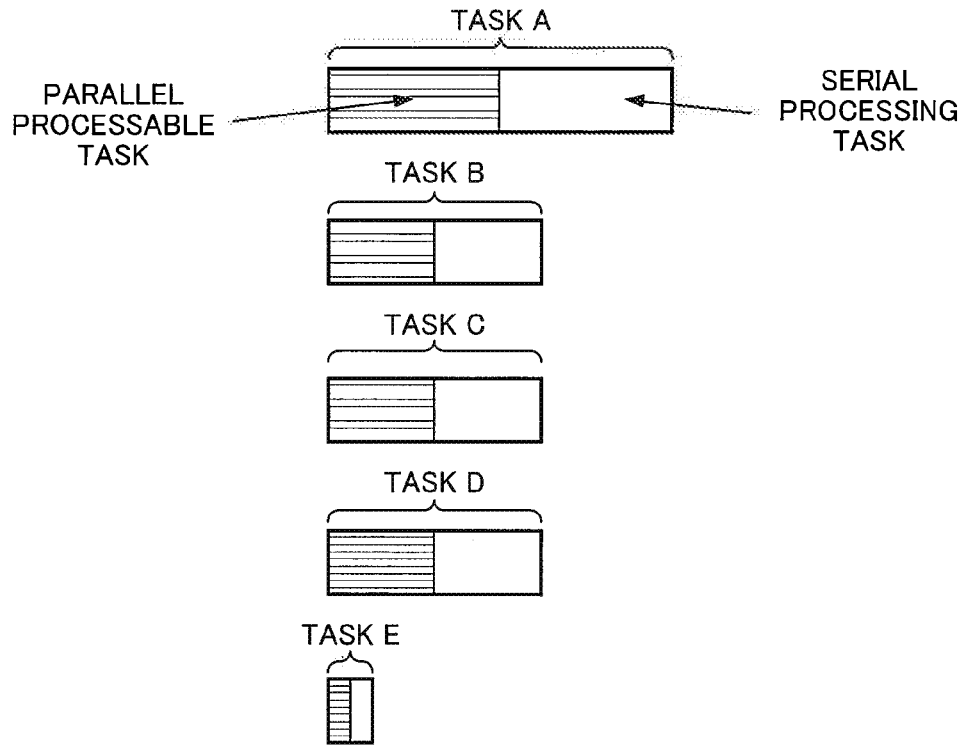
FIG. 12 is a figure for explaining operation of a task division unit 10 and an assignment unit 20 according to a fourth exemplary embodiment of the present invention.
Figure 13:
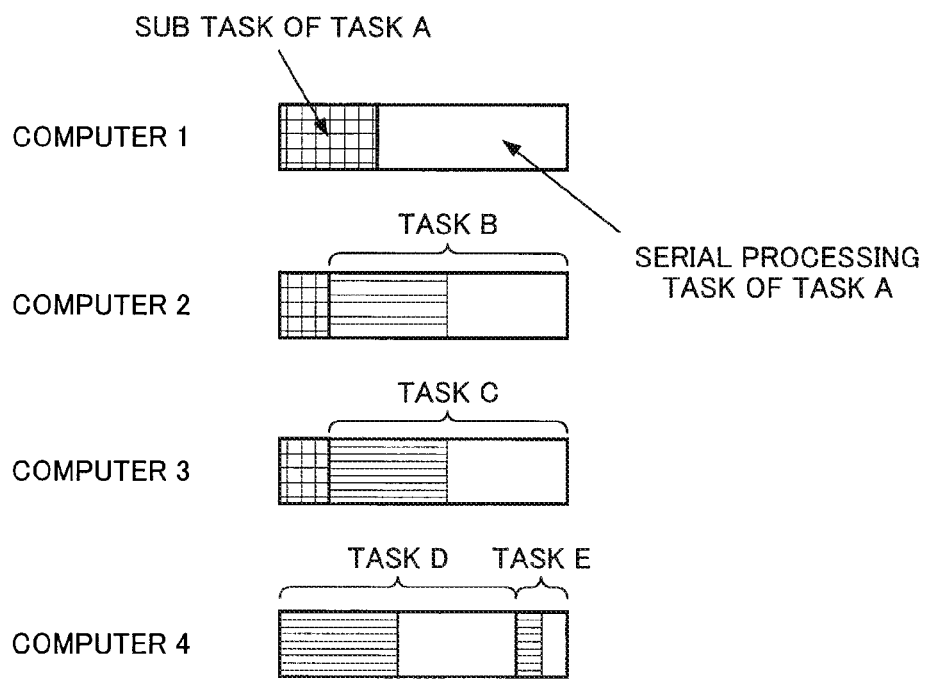
FIG. 13 is a figure for explaining operation of a task division unit 10 and an assignment unit 20 according to a fourth exemplary embodiment of the present invention.
Figure 14:
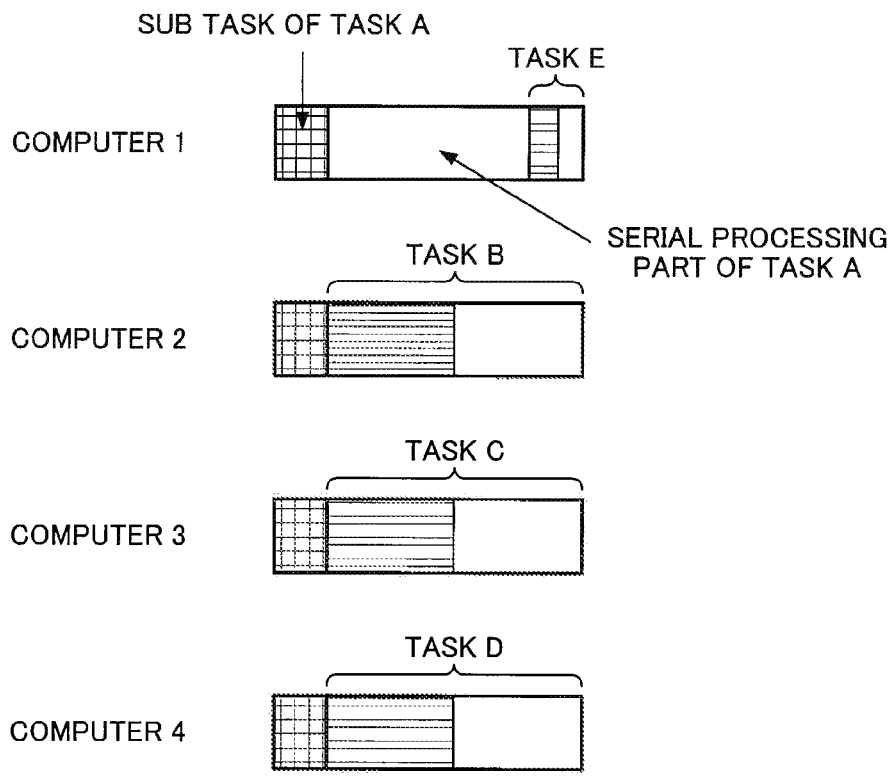
FIG. 14 is a figure for explaining an effect of a fourth exemplary embodiment of the present invention.

FIG. 12, FIG. 13, and FIG. 14 are figures for explaining the operations of the task division unit 10 and the assignment unit 20 according to the fourth exemplary embodiment. As shown in FIGS. 12 to 14, in this example, a case in which a job which can be divided into five tasks is performed by four computers is considered.

FIG. 12 shows five tasks (the tasks A to E). As shown in FIG. 12, the serial processing task of the task A is larger than the serial processing tasks of the task B to the task E. The task division unit 10 divides the parallel processable task of the task A into a plurality of sub tasks.

FIG. 13 is a figure showing a state in which the task division unit 10 divides the parallel processable task of the task A shown in FIG. 12 into the sub tasks wherein the division is performed so that the numbers of the records processed in all the sub tasks are different from each other and the assignment unit 20 assigns the sub task of which the number of the records processed therein is greater than the number of the records processed in another sub task to the computer (the computer 1) to which the serial processing task of the task A is assigned. In an example shown in FIG. 13, the parallel processable task of the task A is divided into three sub tasks and three sub tasks are assigned to the computer 1, the computer 2, and the computer 3, respectively. In an example shown in FIG. 13, the size of the sub task assigned to the computer 1 is two times larger than the size of the sub task assigned to the computer 2 and the computer 3.

The assignment unit 20 selects the computer to which the sub task is not assigned from among the computers other than the computer (the computer 1) to which the serial processing task that is the post-processing of the parallel processable task is assigned. In an example shown in FIG. 13, the sub task is not assigned to the computer 4. Therefore, the computer 4 does not need to transfer a result of the execution of the sub task to the computer 1. It is desirable that the assignment unit 20 select the computer whose data transfer cost to transfer data to the computer (the computer 1) which performs the serial processing is high as the computer to which the sub task is not assigned.

FIG. 14 is a figure for explaining an effect of this exemplary embodiment. Here, it is assumed that the parallel processable task of the task A shown in FIG. 12 is divided into sub tasks wherein the division is performed so that the numbers of the records processed in all the sub tasks are equal to each other. As shown in FIG. 14, the parallel processable task of the task A is divided into four sub tasks and four sub tasks are assigned to the computers 1 to 4, respectively. As shown in FIG. 14, the sub task of the task A, the serial processing task of the task A, and the tasks B to E are assigned to four computers (the computers 1 to 4). When the computers 2, 3 and 4 perform the sub task of the task A, the computers 2, 3 and 4 have to transfer a result of the execution of the sub task to the computer 1. In this case, the data communication cost of the computer 4 increases in comparison with a case in which the tasks are scheduled as shown in FIG. 13.

Thus, the task division unit 10 according to the fourth exemplary embodiment divides the parallel processable task wherein the division is performed so that the numbers of the records processed in all the sub tasks are different from each other. The assignment unit 20 according to the fourth exemplary embodiment assigns the sub task of which the number of the records processed therein is greater than the number of the records processed in another sub task to the computer to which the serial processing task that is the post-processing of the parallel processable task is assigned. The assignment unit 20 selects the computer to which the sub task is not assigned from among the computers other than the computer to which the serial processing task that is the post-processing of the parallel processable task is assigned. The data processing system 1000 according to the fourth exemplary embodiment has such configuration. Therefore, the data processing system 1000 according to the fourth exemplary embodiment can suppress the data transfer cost of the computer to which the sub task is not assigned.

<Fifth Exemplary Embodiment>

The operations of the task division unit 10 and the assignment unit 20 in the data processing system 1000 according to a fifth exemplary embodiment are different from those of the task division unit 10 and the assignment unit 20 in the data processing system 1000 according to the first, second, third, or fourth exemplary embodiment. The data processing system 1000 according to this exemplary embodiment performs the serial processing task in which the records included in the record set are processed in a predetermined order.

In the data processing system 1000, when the task division unit 10 receives a task execution instruction, the task division unit 10 receives information in which a processing order of the records is determined. The task division unit 10 calculates a processing execution time of the serial processing task included in the task on the basis of the number of the records included in the record set that is the processing target of the task. The task division unit 10 divides the parallel processable task that is the preprocessing of the serial processing task larger than another serial processing task into a plurality of sub tasks. The task division unit 10 subdivides the record set into a set of small records according to the processing order of the records.

For example, when a task in which two hundred records that are the processing targets are processed is performed by four computers, the task division unit 10 divides the record set into four sets, each of which includes fifty records. In this case, the task division unit 10 sets the records from a first processed record to a fiftieth processed record to a set of the records that is processed in a first sub task. The task division unit 10 sets the records from a fifty-first sequentially processed record to a one hundredth sequentially processed record to a set of the records that is processed in a second sub task. The task division unit 10 sets the records from a one hundred-first sequentially processed record to a one hundredth fiftieth sequentially processed record to a set of the records that is processed in a third sub task. The task division unit 10 sets the records from a one hundred fifty-first sequentially processed record to a two hundredth sequentially processed record to a set of the records that is processed in a fourth sub task.

The assignment unit 20 assigns the sub task that includes the first record processed in the serial processing task as the processing target to the computer to which the serial processing task that is the post-processing of the parallel processable task is assigned.

Figure 15:
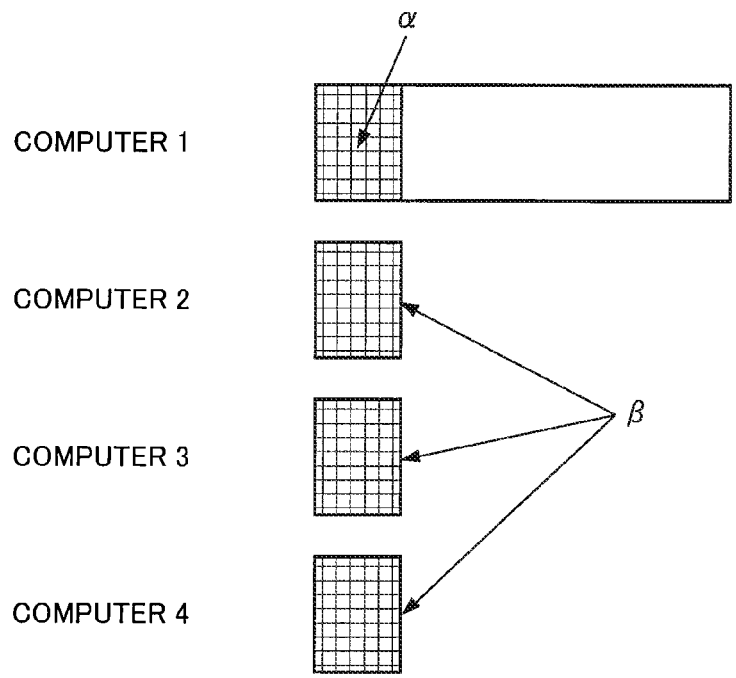
FIG. 15 is a figure for explaining operation of an assignment unit 20 according to a fifth exemplary embodiment of the present invention.
Figure 16:
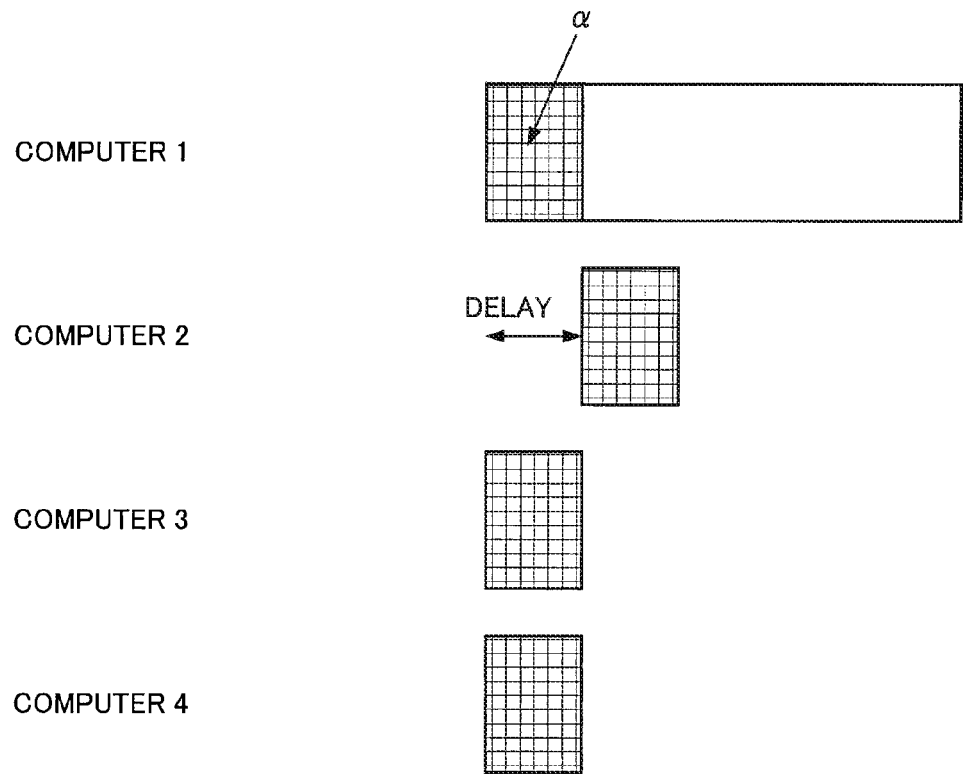
FIG. 16 is a figure for explaining an effect of a fifth exemplary embodiment of the present invention.

FIG. 15 is a figure showing a state in which the assignment unit 20 assigns the sub task that includes the first record processed in the serial processing task as the processing target to the computer (the computer 1) to which the serial processing task is assigned. FIG. 16 is a figure for explaining an effect of the fifth exemplary embodiment. In FIG. 15 and FIG. 16, the sub task assigned to the computer 1 is "the sub task (represented by α in FIGS. 15 to 18) that includes the first processed record as the processing target". In FIG. 15, the sub task assigned to the computers 2, 3, and 4 is "the sub task (represented by β in FIGS. 15 to 18) that does not include the first processed record as the processing target".

FIG. 16 shows a state in which when the schedule is made as shown in FIG. 15, a delay of the execution of the sub task performed by the computer 2 occurs. As shown in FIG. 16, the delay of the computer 2 does not influence the processing time of the whole job. That is because when the computer 1 completes the execution of the sub task that includes the first processed record as the processing target, the computer 1 can start the execution of the serial processing task. During a period in which the computer 1 performs the serial processing task, the computer 2 completes the execution of the sub task assigned to the computer 2 and transmits a result of the execution to the computer 1. In this case, the delay of the execution of the sub task performed by the computer 2 does not influence the processing time of the whole job.

Figure 17:
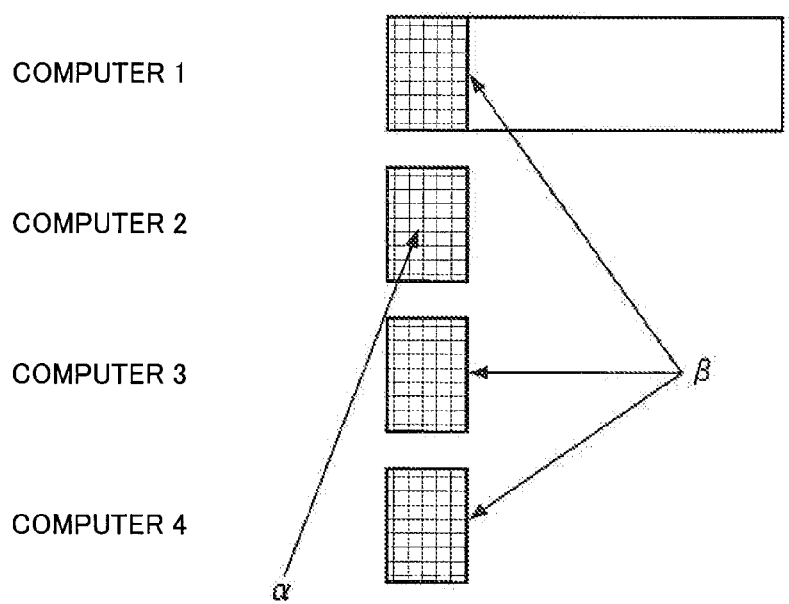
FIG. 17 is a figure for explaining an effect of a fifth exemplary embodiment of the present invention.
Figures 18, 19:
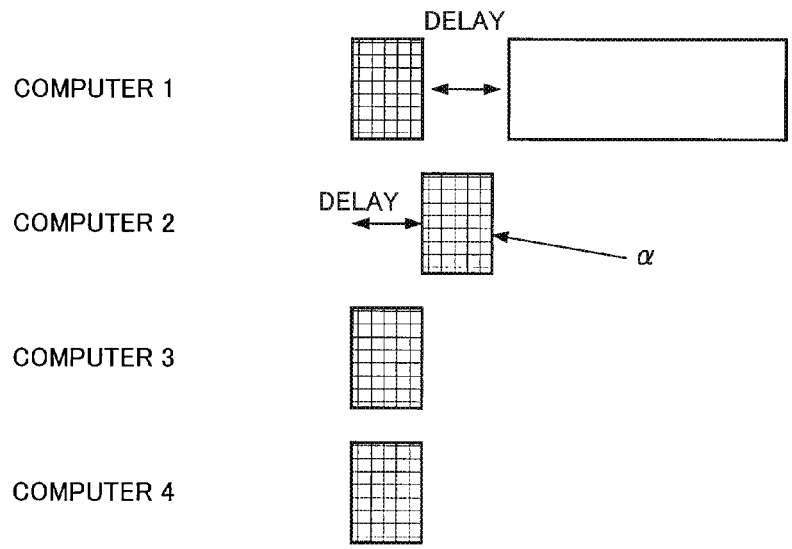
FIG. 18 is a figure for explaining an effect of a fifth exemplary embodiment of the present invention.
FIG. 19 is a figure for explaining a specific example of a table, a record set, and a record of the present invention.

FIG. 17 and FIG. 18 are figures for explaining an effect of the fifth exemplary embodiment. In FIG. 17 and FIG. 18, "the sub task that includes the first processed record as the processing target" is represented by α and "the sub task that does not include the first processed record as the processing target" is represented by β. FIG. 17 is a figure showing a state in which the assignment unit 20 does not assign the sub task that includes the first processed record as the processing target to the computer (the computer 1) to which the serial processing task is assigned. As shown in FIG. 17, the sub task that includes the first processed record as the processing target is assigned to the computer 2.

FIG. 18 shows a state in which when the schedule is made as shown in FIG. 17, the delay of the execution of the sub task performed by the computer 2 occurs. As shown in FIG. 18, the processing time of the whole job is delayed by the delay of the computer 2. That is because the computer 1 cannot start to perform the serial processing task before the computer 2 completes the execution of the sub task.

Thus, the assignment unit 20 according to the fifth exemplary embodiment assigns the sub task that includes the first record processed in the serial processing task as the processing target to the computer to which the serial processing task that is the post-processing of the parallel processable task is assigned. The data processing system 1000 according to the fifth exemplary embodiment has such configuration. Therefore, even when the delay occurs by influence of the re-execution of the task or the like due to for example, an error, a system failure, or the like, the start time of the serial processing task can be prevented from being influenced.

Further, in the data processing system 1000 according to the fifth exemplary embodiment, the job reception unit 30 may receive an input of information in which the processing order of the records is determined instead of the task division unit 10.

<Sixth Exemplary Embodiment>

The data processing device 1000 according to a sixth exemplary embodiment performs a data processing including a JOIN processing and a scan processing that is a post-processing of the JOIN processing to a table.

FIG. 19 is a figure showing an example of the table, the record set, and the record in the data processing device 1000 according to the sixth exemplary embodiment. FIG. 19 is shown as an example for ease of understanding the explanation. Therefore, the table, the record set, and the record are not interpreted in a limited sense.

As shown in an example of FIG. 19, the record includes a record identifier (ID), a branch office name, a customer ID, and transaction time. Here, the record ID, the branch office name, the customer ID, and the transaction time are attributes of the record. The attribute of the record includes an "attribute which determines a unit in which the serial processing is performed".

A value of the "attribute which determines a unit in which the serial processing is performed" determines the record set to which the record belongs. For example, when the attribute of the "branch office name" is the "attribute which determines a unit in which the serial processing is performed", a set of the records of which the values of the branch office name are the same as each other is the record set.

For example, in the parallel processing according to the exemplary embodiment, a transaction table shown in FIG. 19 and a master table (not shown) are joined by using the branch office name as a key. For example, in the serial processing according to the exemplary embodiment, with respect to the joined record, the record is scanned in the record set of which the values of the branch office name are the same as each other in transaction time order.

FIG. 20 shows an example of statistical information about the table shown in FIG. 19 (hereinafter, described as statistical information). As shown in FIG. 20, the example of the statistical information is a histogram showing the number of records for each value of the attribute (in an example shown in FIG. 20, the branch office name) which determines a unit in which the serial processing is performed. The statistical information shown in FIG. 20 is shown as an example for ease of understanding the explanation. Therefore, the statistical information is not interpreted in a limited sense. The statistical information may include for example, information about the total number of records, a bias of the number of records for each value of the attribute which determines a unit in which the serial processing is performed, or the like.

Further, the record may include the attribute which determines an order of execution of the serial processing. For example, when the transaction time is the attribute which determines an order of execution of the serial processing, the serial processing may be performed in an increasing order of transaction time in the record set. The statistical information described above may include information on a distribution or the like for each value of the attribute which determines an order of execution of the serial processing.

Figure 21:
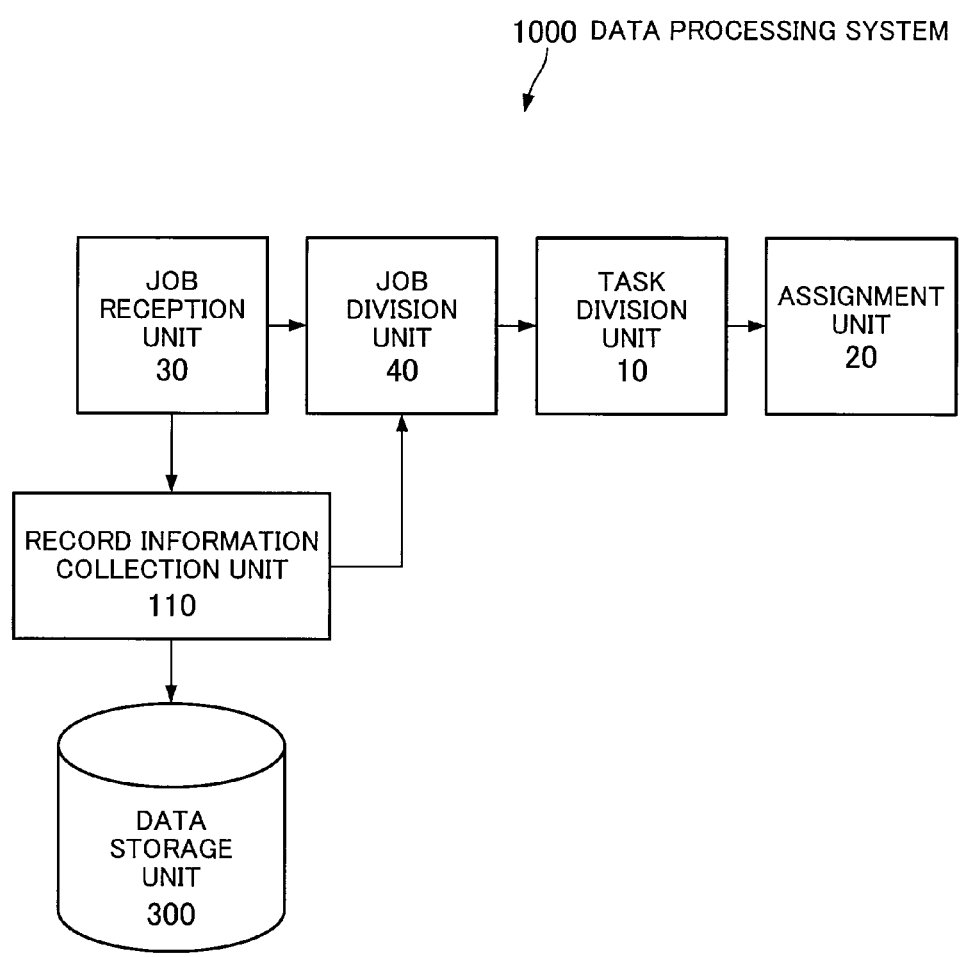
FIG. 21 is a block diagram of a data processing system 1000 according to a sixth exemplary embodiment of the present invention.

FIG. 21 is a block diagram of the data processing system 1000 according to the sixth exemplary embodiment. Further, the same reference numbers are used for the elements shown in FIG. 21 which have the substantially same function as the elements shown in FIG. 2 and FIG. 7. As shown in FIG. 21, the data processing system 1000 according to the sixth exemplary embodiment includes the task division unit 10, a record information collection unit 110, the assignment unit 20, the job reception unit 30, the job division unit 40, and a data storage unit 300.

The job reception unit 30 receives a request for execution of the job. The execution request for the job includes information for specifying a content of the data processing and information for specifying the table that is the processing target. The information for specifying a content of the data processing includes for example, a parameter indicating a percentage of a parallel processable time of the job processing time. The job reception unit 30 outputs the information for specifying the table that is the processing target included in the execution request for the job to the record information collection unit 110.

The record information collection unit 110 acquires the statistical information from the data storage unit 300 on the basis of the information for specifying the table that is the processing target. The record information collection unit 110 may read the table stored in the data storage unit 300 and calculate the statistical information. Alternatively, the record information collection unit 110 may acquire the statistical information that is stored together with the table in the data storage unit 300 in advance. The record information collection unit 110 outputs the statistical information to the job division unit 40.

The job division unit 40 divides the job received by the job reception unit 30 into a plurality of tasks on the basis of the statistical information. For example, a case in which the job reception unit 30 receives the job in which the table shown in FIG. 19 is used as the processing target will be explained. The table shown in FIG. 19 includes 600 records.

When a set of the records in which the values of the branch office name are the same as each other is the record set, the job division unit 40 divides the table including 600 records into the record sets: one record set including 200 records (Tokyo branch office), two record sets each of which includes 100 records (Sapporo branch office and Sendai branch office), two record sets each of which includes 50 records (Yokohama branch office and Osaka branch office), and four record sets each of which includes 25 records (Kyoto branch office, Kobe branch office, Hiroshima branch office, and Fukuoka branch office).

The task division unit 10 receives the execution request for a plurality of the divided tasks. The task division unit 10 calculates the processing time of the task and the serial processing task included in the task on the basis of the information for specifying a content of the data processing and the statistical information. For example, the task division unit 10 inputs the number of the records included in the record set that is the processing target of the task and the information for specifying a content of the data processing received by the job reception unit 30 and calculates the processing time of the task. The task division unit 10 divides the task into a plurality of sub tasks and one serial processing task.

The assignment unit 20 assigns a plurality of the sub tasks to a plurality of computers so that the sub tasks are performed before the corresponding serial processing task and another task are performed.

The data processing system 1000 according to the sixth exemplary embodiment has such configuration. Therefore, a data processing system which optimizes the processing time of the job in which the data processing including the JOIN processing and the scan processing that is the post-processing of the JOIN processing is performed to the table, a data processing method, and a program can be provided.

<Seventh Exemplary Embodiment>

The operations of a job division unit 41, a task division unit 11 and the assignment unit 21 in the data processing device 1000 according to a seventh exemplary embodiment are different from the operations of these units according to the sixth exemplary embodiment. The data processing device 1000 according to the seventh exemplary embodiment divides the task and assigns the divided task by considering a deadline.

Figure 22:
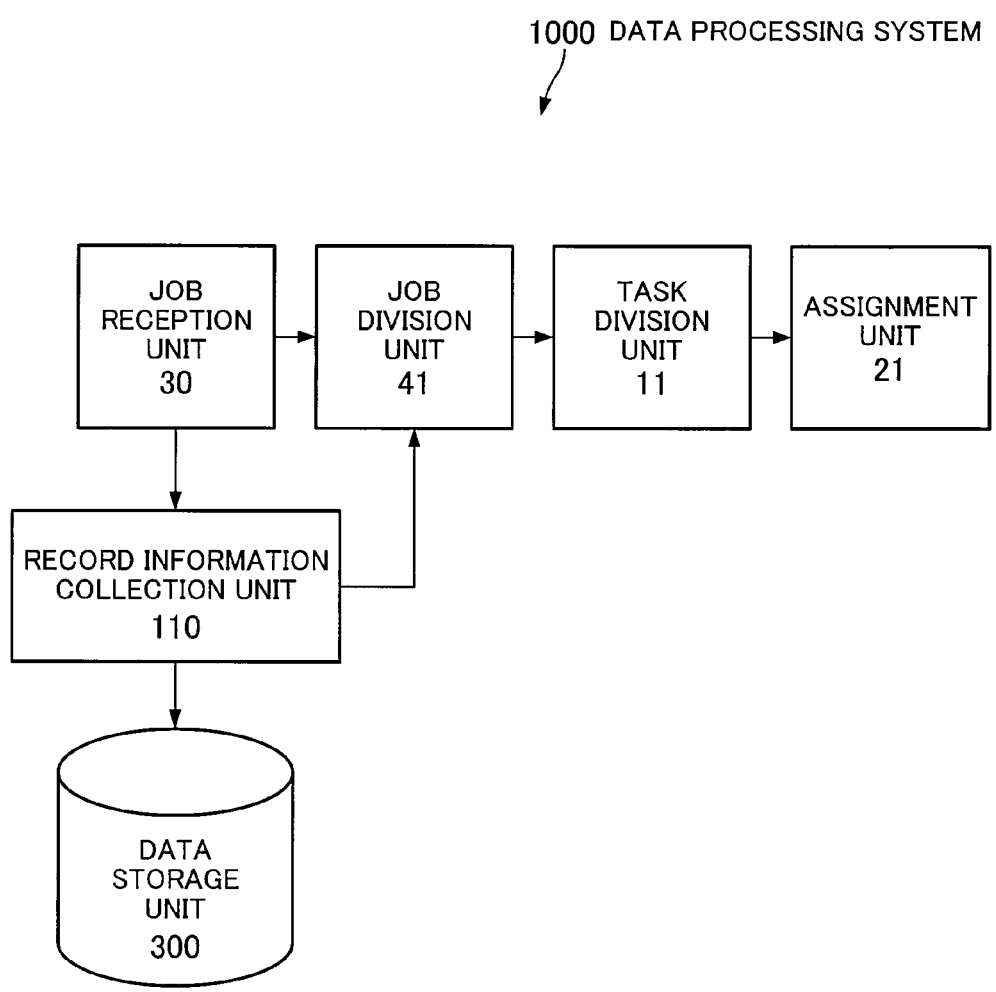
FIG. 22 is a block diagram of a data processing system 1000 according to a sixth exemplary embodiment of the present invention.

FIG. 22 is a block diagram of the data processing system 1000 according to the seventh exemplary embodiment. Further, the same reference numbers are used for the elements shown in FIG. 22 which have the substantially same function as the elements shown in FIG. 21.

The job division unit 41 calculates the deadline. For example, the deadline is an average time obtained by dividing the processing time of the job by the number of the computers. When the processing time of the task exceeds the deadline, the task division unit 11 divides the task. The assignment unit 21 adjusts a position of the deadline as described later.

Figure 23:
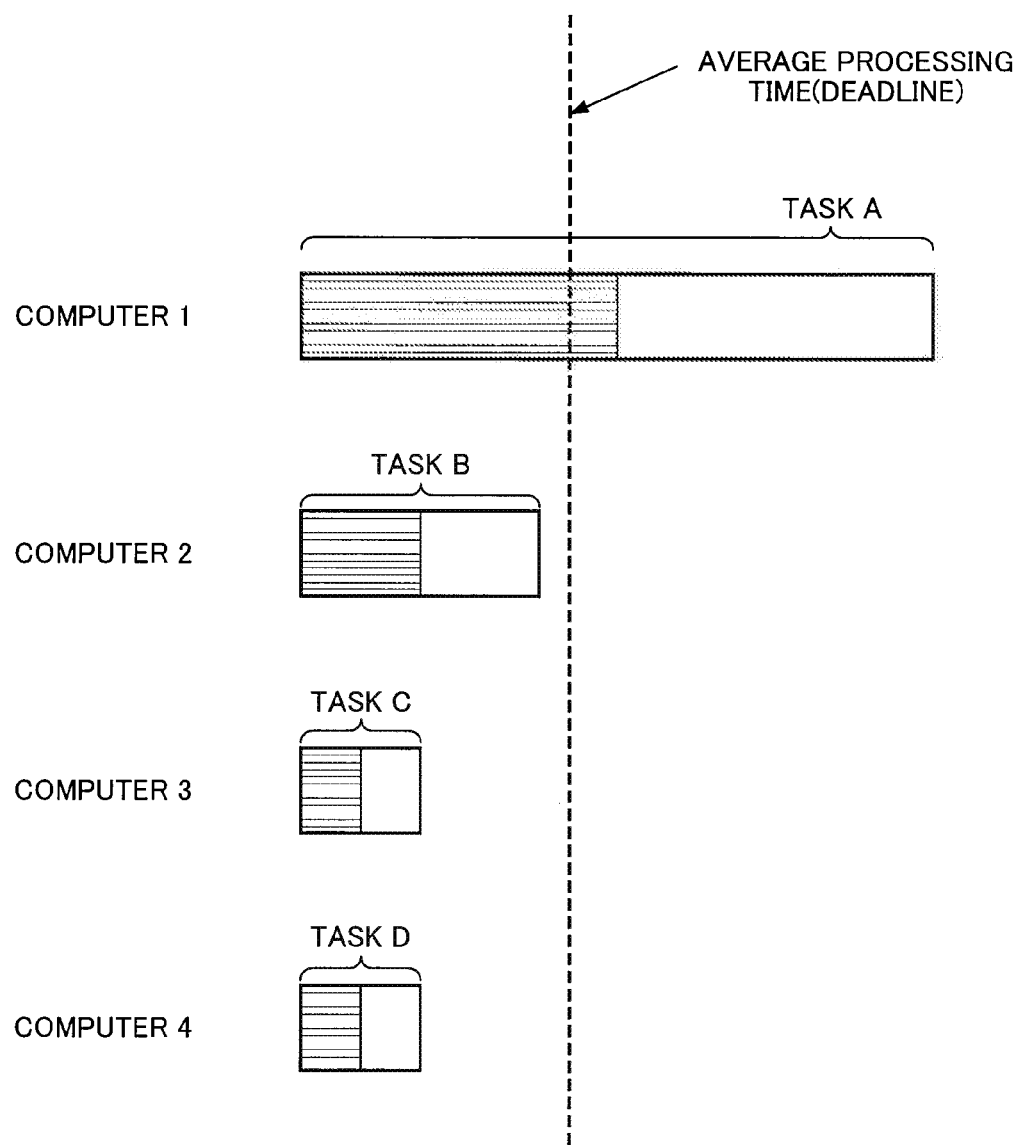
FIG. 23 is a figure for explaining a deadline in a seventh exemplary embodiment of the present invention.

The deadline will be explained below. In the explanation, a case in which the job which can be divided into four tasks is processed by four computers is taken as an example. FIG. 23 is a figure showing a state in which four tasks (the tasks A to D) are assigned to four computers. The dotted line shown in FIG. 23 indicates an average time (an average processing time) obtained by dividing the total processing time of all the tasks (A to D) by the number (four) of the computers. When the job is ideally scheduled, the execution of the job is completed within this average processing time. Accordingly, a job division unit 40A sets this average processing time as the deadline.

A task division unit 10A calculates the processing time of the task A that is the largest task. The processing time of the task A exceeds the deadline. As shown in FIG. 23, if this goes on, the processing time of the task A will be the bottleneck of the processing time of the whole job. Accordingly, the task division unit 10A divides the task A. The assignment unit 20 assigns the sub tasks of the task A to the computers 1 to 4.

Figure 24:
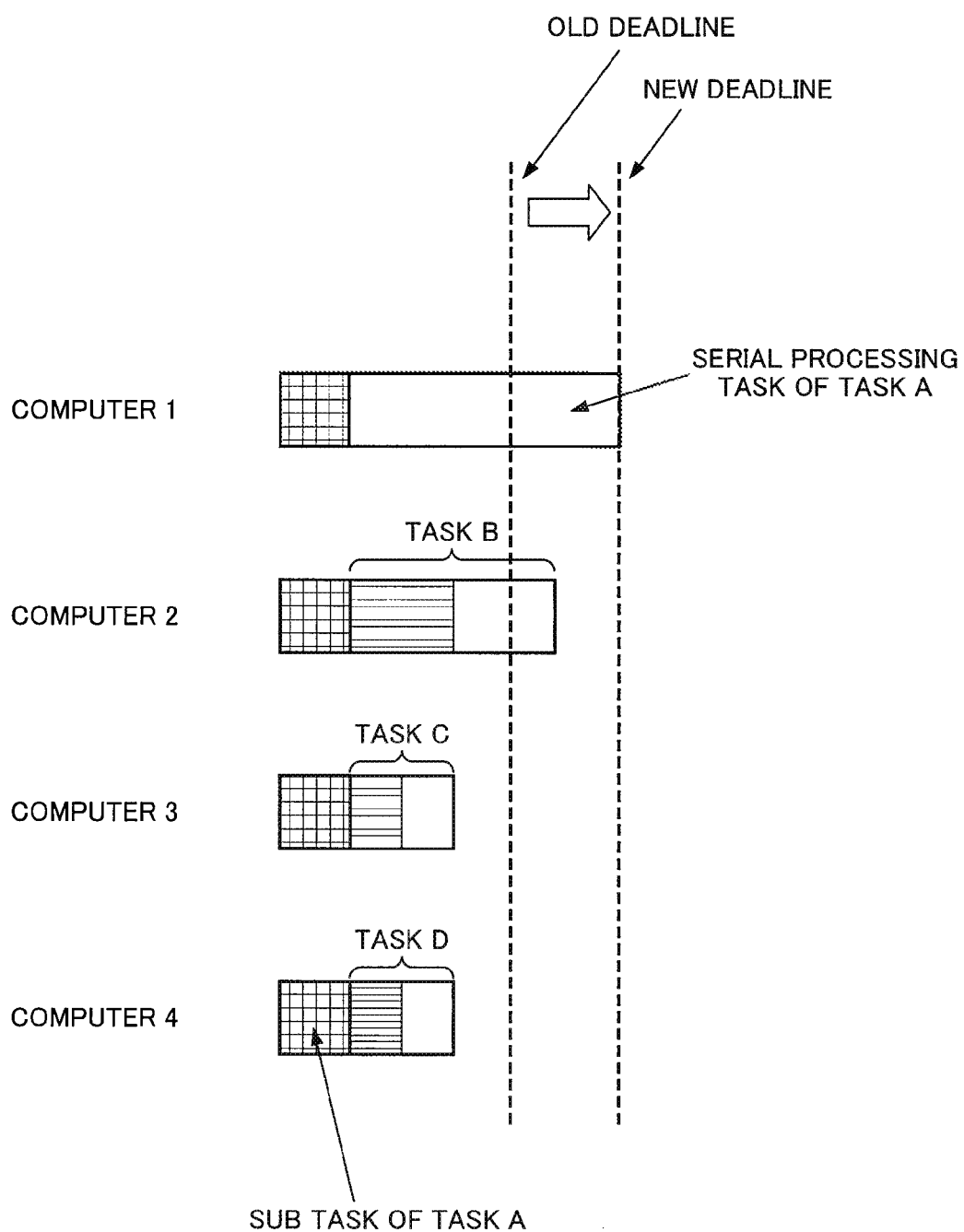
FIG. 24 is a figure for explaining a deadline in a seventh exemplary embodiment of the present invention.

FIG. 24 is a figure showing a state in which the tasks are assigned to the computers in such manner. However, as shown in FIG. 24, even when the task division unit 10A divides the task A, the processing time of the task A exceeds the deadline. In an example shown in FIG. 24, because the serial processing task of the task A exceeds the deadline regardless of any division of the task, the scheduling on which the execution of the job is completed by the deadline cannot be made. Accordingly, the assignment unit 20 changes the position of the deadline from the average processing time (old deadline) of all the tasks to the completion time (new deadline) of a serial processing sub task of the task A.

The processing time of the task B that is the second largest task exceeds the old deadline but it does not exceed the new deadline. Therefore, the task division unit 10 does not divide the task B. That is because even if the task division unit 10 divides the task B, the processing time of the whole job cannot be reduced so as not to exceed the new deadline.

[Explanation of Operation]

Figure 25:
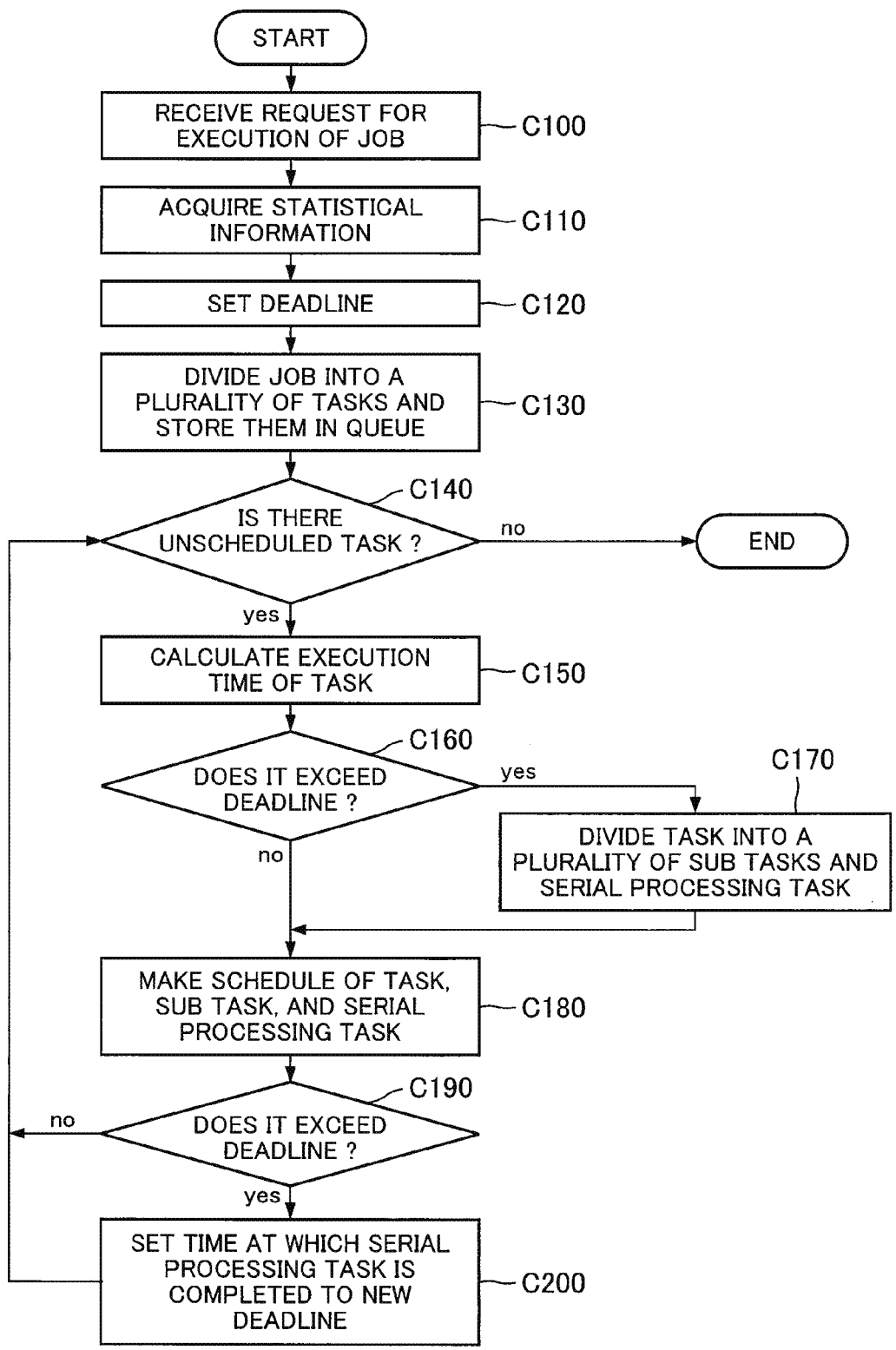
FIG. 25 is a flowchart for explaining operation of a data processing system 1000 according to a seventh exemplary embodiment of the present invention.

FIG. 25 is a flowchart for explaining the operation of the data processing system 1000. As shown in FIG. 25, the job reception unit 30 receives the execution request for the job (C100). The record information collection unit 110 acquires the statistical information that is the processing target of the job from the data storage unit 300 on the basis of the information for specifying the table that is the processing target included in the execution request for the job received by the job reception unit 30 (C110).

Next, the job division unit 10 calculates the processing time of the job on the basis of the information which specifies a content of the data processing included in the execution request for the job, the acquired statistical information, and the like. The job division unit 10 calculates the average value by dividing the processing time of the job by the number of the computers as the deadline (C120).

The job division unit 40 divides the job into a plurality of tasks on the basis of the statistical information. The task division unit 10 stores the divided tasks in an unscheduled task queue in a decreasing order of the size of the task (C130). The task division unit 10 repeats the following processing until the unscheduled task queue is empty (C140).

The task division unit 10 takes out the task from the unscheduled task queue and calculates the processing time thereof (C150). The task division unit 10 determines whether or not the calculated processing time exceeds the deadline (C160). When the processing time exceeds the deadline, the task division unit 10 divides the task (C170). When the processing time does not exceed the deadline, the data processing system 1000 proceeds to the processing of step C180.

The assignment unit 20 assigns the task, the sub task, and the serial processing task to the computer so that the sub task is performed before another task and the serial processing task are performed (C180).

After the schedule is made, the assignment unit 20 determines whether or not the processing time of the serial processing task exceeds the deadline (C190). When the processing time of the serial processing task exceeds the deadline, the assignment unit 20 sets the time at which the serial processing task is completed to the new deadline (C200).

The data processing device 1000 according to the seventh exemplary embodiment divides the task and assigns the divided task by considering the deadline. The data processing system 1000 according to the seventh exemplary embodiment has such configuration. Accordingly, the unnecessary parallelization is prevented and the overhead due to unnecessary parallelization can be prevented from being generated.

<Eighth Exemplary Embodiment>

In the data processing device 1000 according to an eighth exemplary embodiment, a task execution unit 200 performs the task on the basis of a result outputted by the assignment unit 20.

Figure 26:
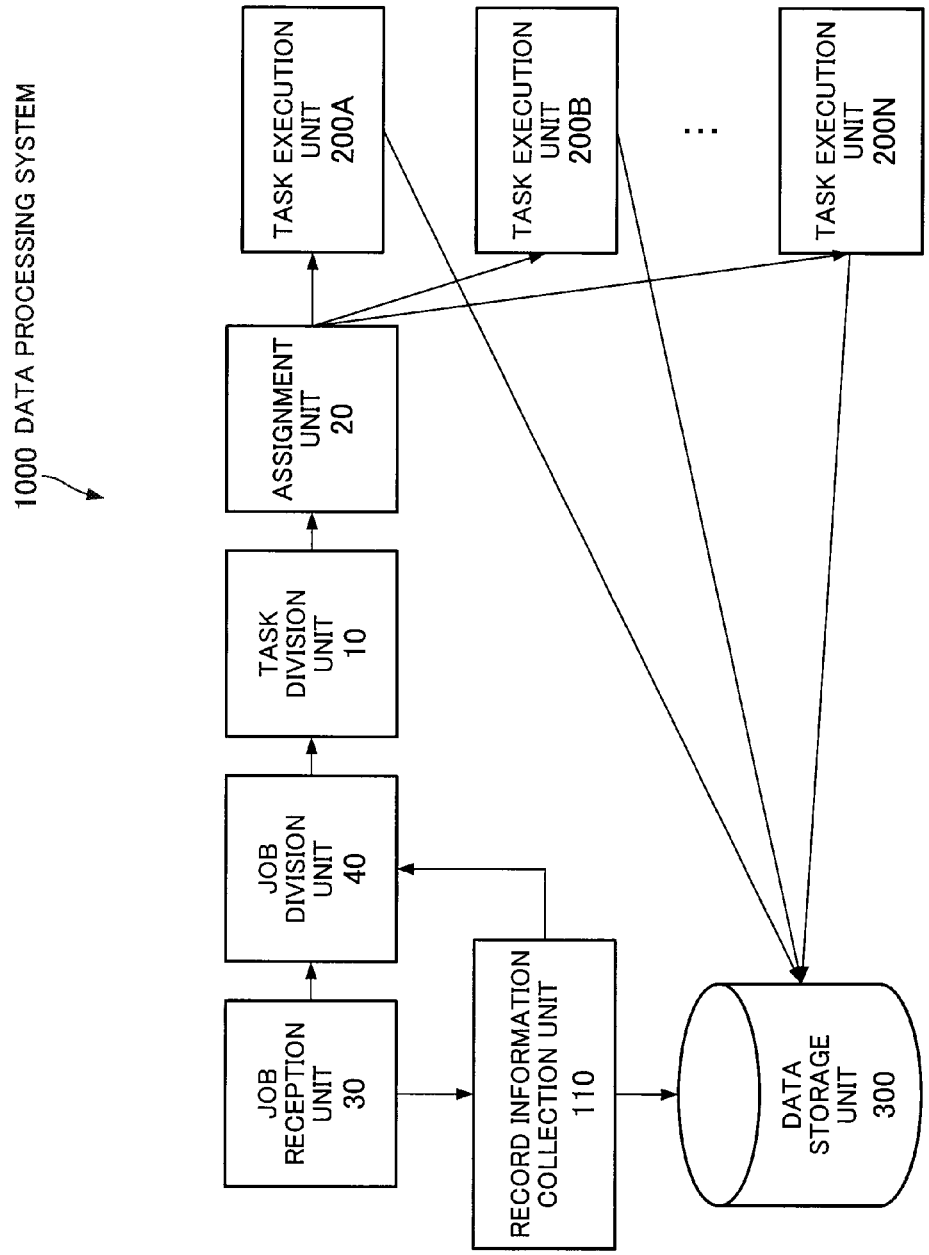
FIG. 26 is a block diagram of a data processing system 1000 according to an eighth exemplary embodiment of the present invention.

FIG. 26 is a block diagram of the data processing system 1000 according to the eighth exemplary embodiment. Further, the same reference numbers are used for the elements shown in FIG. 26 which have the substantially same function as the elements shown in FIG. 21. As shown in FIG. 26, the data processing system 1000 according to the eighth exemplary embodiment includes the task division unit 10, the record information collection unit 110, the assignment unit 20, the job reception unit 30, the job division unit 40, task execution units 200A to 200N, and the data storage unit 300. Further, the task execution units 200A to 200N may be abbreviated as the task execution unit 200.

The assignment unit 20 assigns the task, the sub task, and the serial processing task to the task execution unit 200 and outputs a result of assignment as schedule data. The task execution unit 200 performs the assigned task.

Figure 27:
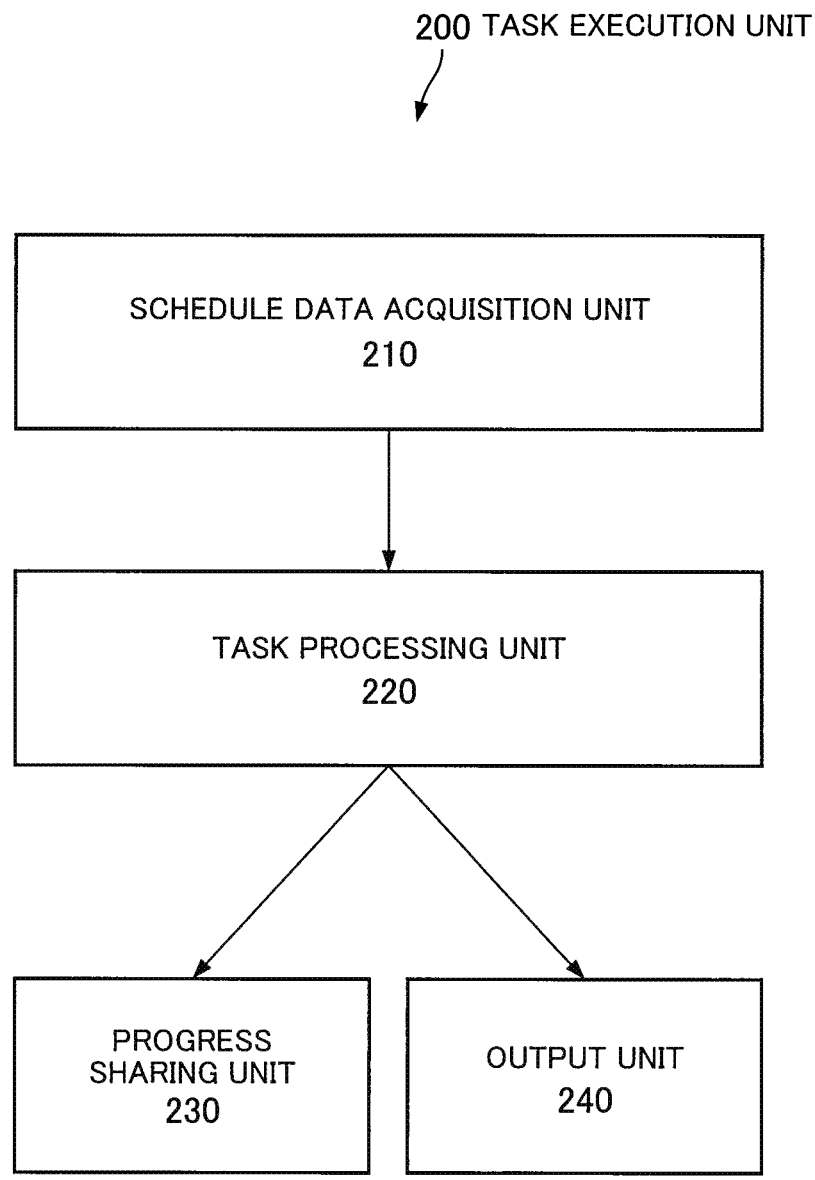
FIG. 27 is a block diagram of a task execution unit 200 according to an eighth exemplary embodiment of the present invention.

FIG. 27 is a block diagram showing a configuration of the task execution unit 200 shown in FIG. 26. As shown in FIG. 27, the task execution unit 200 includes a schedule data acquisition unit 210, a task processing unit 220, a progress sharing unit 230, and an output unit 240.

A schedule data acquisition unit 210 acquires the schedule data outputted by the assignment unit 20. The schedule data acquisition unit 210 may input the schedule data from the assignment unit 20 or read the schedule data that is outputted and stored at a referable place by the assignment unit 20. The task processing unit 220 performs the assigned task.

The progress sharing unit 230 shares the progress (for example, Not Executed, Under-execution, Executed) of the assigned task with another task execution unit 200. The progress sharing unit 230 may share the progress by communicating with another task execution unit 200 or may share the progress by writing the progress of the task in the schedule data and reading the progress of the task from the schedule data. The output unit 240 outputs the data that is a processing result of the assigned task.

FIG. 28 is a figure showing an example of the schedule data outputted by the assignment unit 20. The example shown in FIG. 28 is shown as an example for ease of understanding the explanation. Therefore, the schedule data is not interpreted in a limited sense.

Hereinafter, the task, the sub task, and the serial processing task assigned to the task execution unit 200 may be totally abbreviated to the "task".

Figure 29:
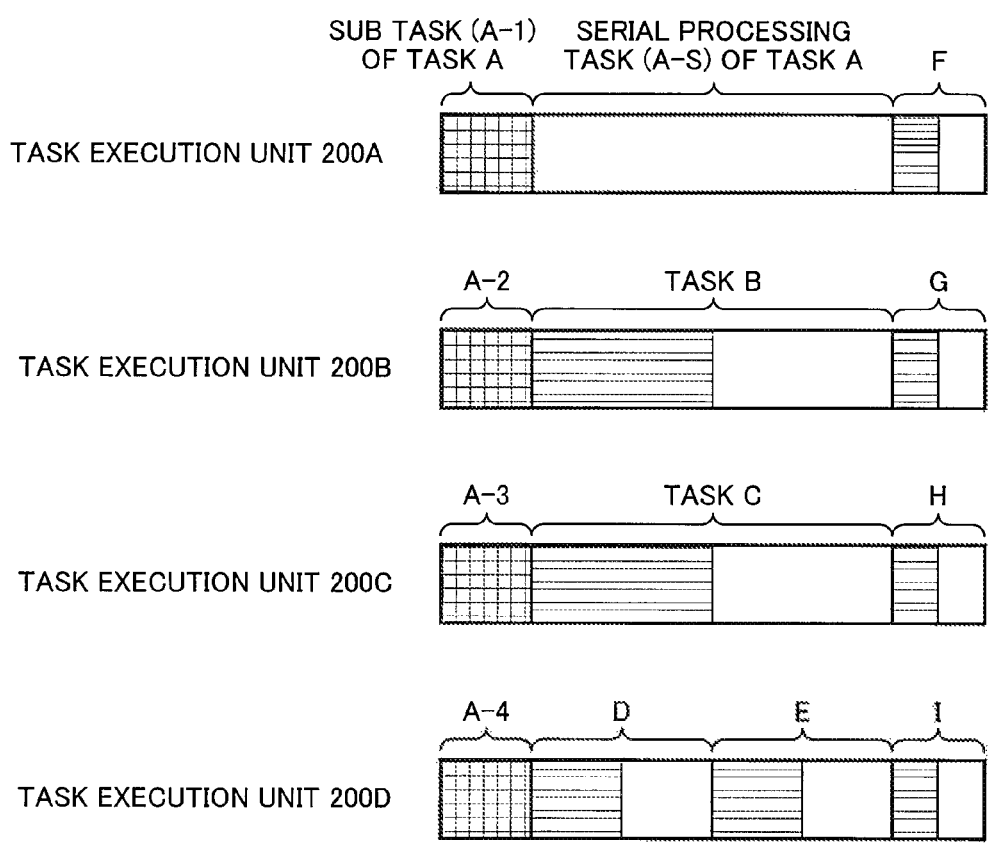
FIG. 29 is a figure for explaining a specific example of schedule data in an eighth exemplary embodiment of the present invention.

The schedule data shown in FIG. 28 corresponds to a state of the task assignment shown in FIG. 29. As shown in FIG. 28, for example, the schedule data includes a task ID, an assignment destination ID, a processing target record, a priority, a task type, and an aggregation destination task ID.

The task ID is an identifier for distinguishing a certain task from another task. The assignment destination ID is information to identify the task execution unit 200 which performs the task. The processing target record is information to show the record that is the processing target of the task. The priority is information to show an order in which the tasks are processed when a plurality of tasks are assigned to the task execution unit 200. In an example shown in FIG. 28, the smaller priority value means higher priority. The task type is information to show a type of the task: the task that is not divided (Normal), the sub task (Parallelized), or the serial processing task (Sequential). The aggregation destination task ID is a task ID of the serial processing task corresponding to the sub task.

The processing target record may be designated by for example, a value or a value range of the attribute (the branch office name) which determines the unit in which the serial processing is performed, a value or a value range of the attribute (the transaction time) which determines the order in which the serial processing is performed, or a combination of these values or value ranges of the attributes.

The processing target record of the sub task (Parallelized) may be determined by making hash dispersion of the record that is the processing target of the task corresponding to the sub task by the number of the task execution units 200. For example, the record that is the processing target of the sub task may be assigned to each of the task execution units 200 in a dictionary order of the hash value.

Figure 30:
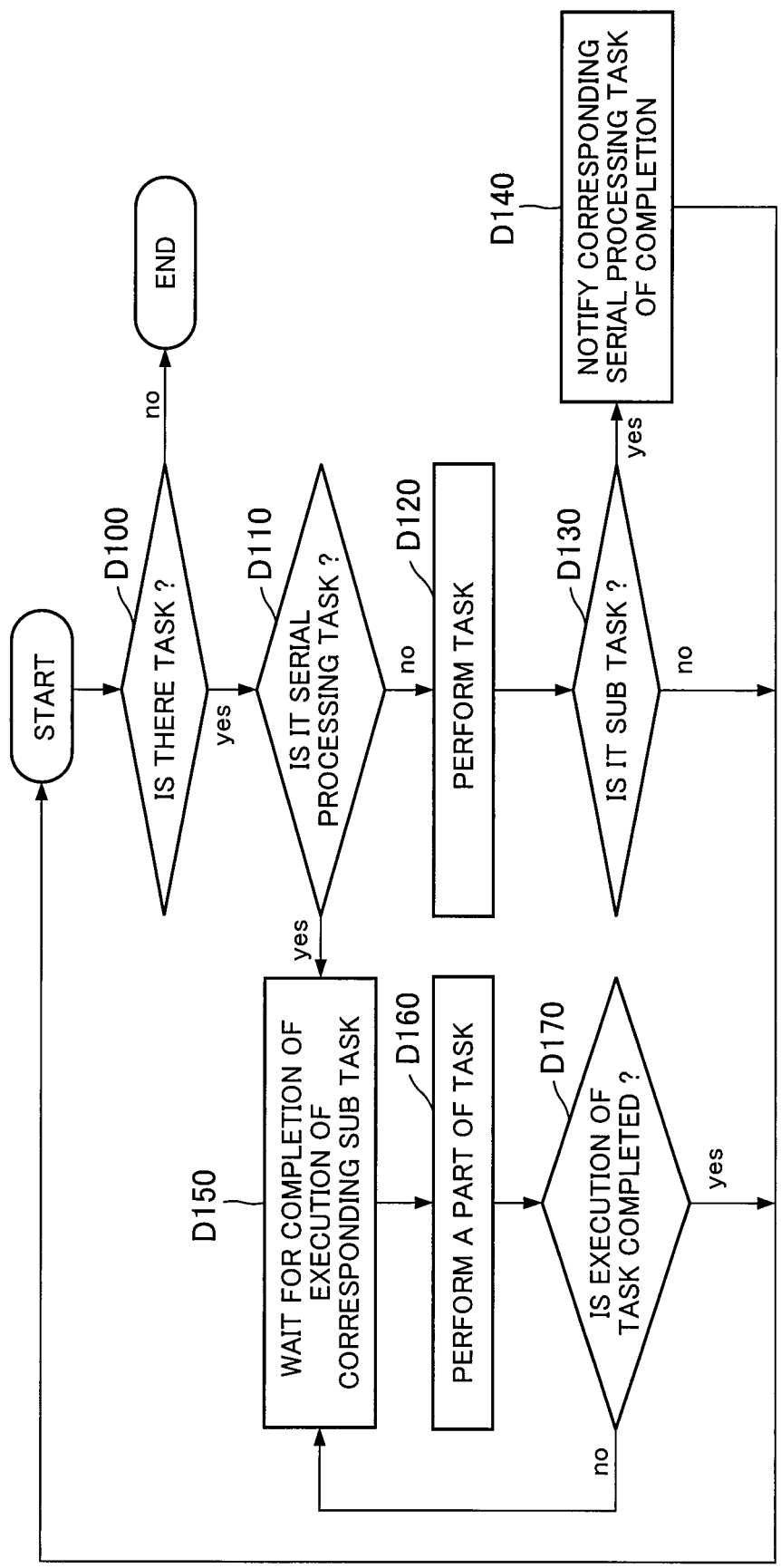
FIG. 30 is a flowchart for explaining operation of a task execution unit 200 according to an eighth exemplary embodiment of the present invention.

FIG. 30 is a flowchart for explaining the operation of the task execution unit 200. As shown in FIG. 30, the task execution unit 200 repeats the following processing until all the tasks assigned by the assignment unit 20 are completed (D100).

The task execution unit 200 takes out one of the tasks with high priority from among the assigned tasks. The task execution unit 200 determines whether or not the taken out task is the serial processing task (Sequential) (D110). When the taken out task is the serial processing task (Sequential), the process proceeds to the processing of step D150. When the taken out task is not the serial processing task (Normal or Parallelized), the task execution unit 200 acquires the processing target record of the taken out task from the data storage unit 300 and performs the task (D120).

The task execution unit 200 determines whether or not the taken out task is the sub task (Parallelized) (D130). When the taken out task is the sub task (Parallelized), the task execution unit 200 performs the sub task and notifies the serial processing task corresponding to the aggregation destination task ID of the completion of the processing (D140). When the taken out task is not the sub task (Parallelized) (Normal), the processing returns to the processing of step D100 and the task execution unit 200 takes out the task with next higher priority.

In the processing of step D110, when the task execution unit 200 takes out the serial processing task (Sequential), the task execution unit 200 waits for the completion of the execution of the sub task corresponding to the serial processing task (D150) and performs the serial processing task as much as it can (D160). The task execution unit 200 determines whether or not the execution of the serial processing task is completed (D170). When the task execution unit 200 completes the execution of the serial processing task, the processing proceeds to the processing of step D100 and when the task execution unit 200 does not complete the execution of the serial processing task, the task execution unit 200 waits for the completion of the execution of the corresponding sub task (D150).

As described above, in the data processing device 1000 according to the eighth exemplary embodiment, the task execution unit 200 performs the task on the basis of a result outputted by the assignment unit 20.

Modification Example of Eighth Exemplary Embodiment

Further, when the task processing unit 220 performs the assigned task, the task processing unit 220 may share a progress of the task with another task processing unit 200. FIG. 31 is a figure showing an example of the schedule data in a case in which the progress of the task is shared. As shown in FIG. 31, the schedule data includes an item of the progress which holds three states: for example, "Not Executed", "Under-execution", and "Executed" for each task ID.

Figure 32:
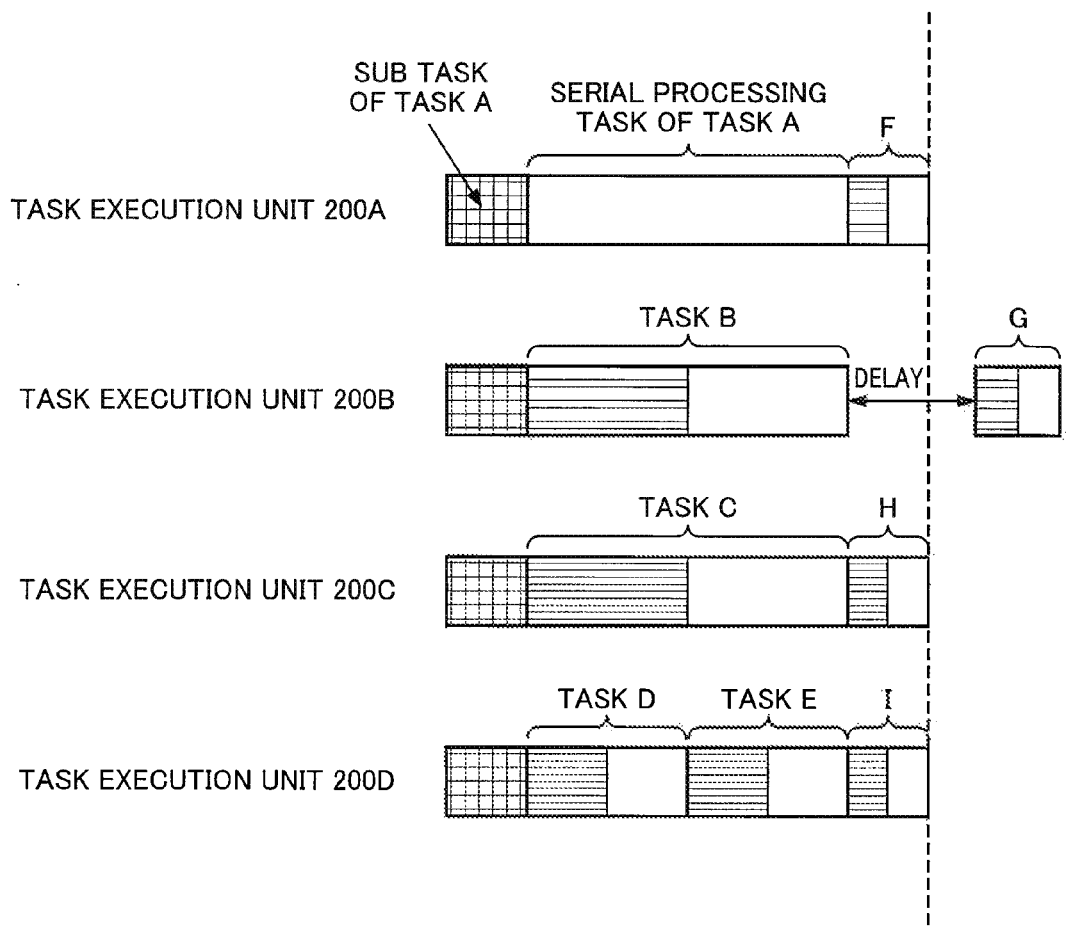
FIG. 32 is a figure for explaining operation of a task execution unit 200 in a modification example of an eighth exemplary embodiment of the present invention.

When the assigned task has already been performed and the task assigned to the another task execution unit 200 is not yet performed, the task processing unit 220 according to the modification example of the eighth exemplary embodiment performs the task that is not yet performed instead of the another task execution unit 200. For example, in an example shown in FIG. 32, when the task execution unit 200A completes the execution of the task corresponding to "F" in the task ID column, there is no more assigned task to be performed by the task execution unit 200A. Accordingly, the task execution unit 200A may perform the task corresponding to "G" in the task ID column instead of the task execution unit 200B.

The data processing system 1000 according to the modification example of the eighth exemplary embodiment has such configuration. Therefore, the data processing system 1000 according to the modification example of the eighth exemplary embodiment can dynamically perform the leveling of task execution even when a system failure occurs during the task execution or a task estimation error exists and whereby, the processing time of the task is increased or decreased. Further, when the assignment unit 20 makes a schedule so that the task whose processing time is large is preferentially performed, the task is subdivided into small tasks and the small tasks are assigned to the task processing units 220. Therefore, the leveling of the execution of the task can be further easily performed.

<Ninth Exemplary Embodiment>

Figure 33:
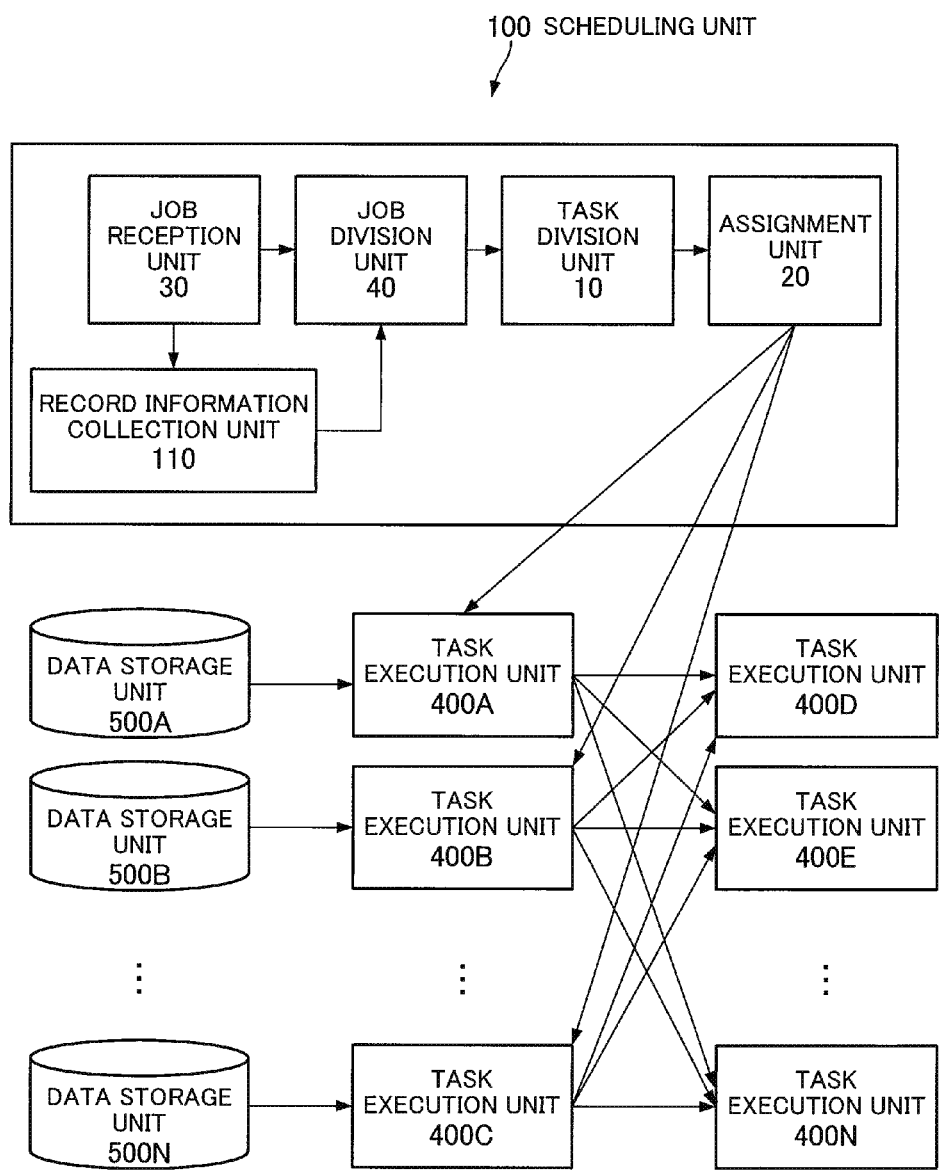
FIG. 33 is a block diagram of a data processing system 1000 according to a ninth exemplary embodiment of the present invention.

The data processing system 1000 according to a ninth exemplary embodiment is performed on a distributed parallel execution platform. FIG. 33 is a block diagram of the data processing system 1000 according to the ninth exemplary embodiment. Further, the same reference numbers are used for the elements shown in FIG. 33 which have the substantially same function as the elements shown in FIG. 21.

As shown in FIG. 33, the data processing system 1000 according to the ninth exemplary embodiment includes a scheduling unit 100, task execution units 400A to 400N, and data storage units 500A to 500N. Further, the task execution units 400A to 400N may be abbreviated as the task execution unit 400. The data storage units 500A to 500N may be abbreviated as the data storage unit 500.

As shown in FIG. 33, in the data processing system 1000, the schedule unit 100 includes the task division unit 10, the assignment unit 20, the job reception unit 30, the job division unit 40, and the record information collection unit 110.

Figure 34:
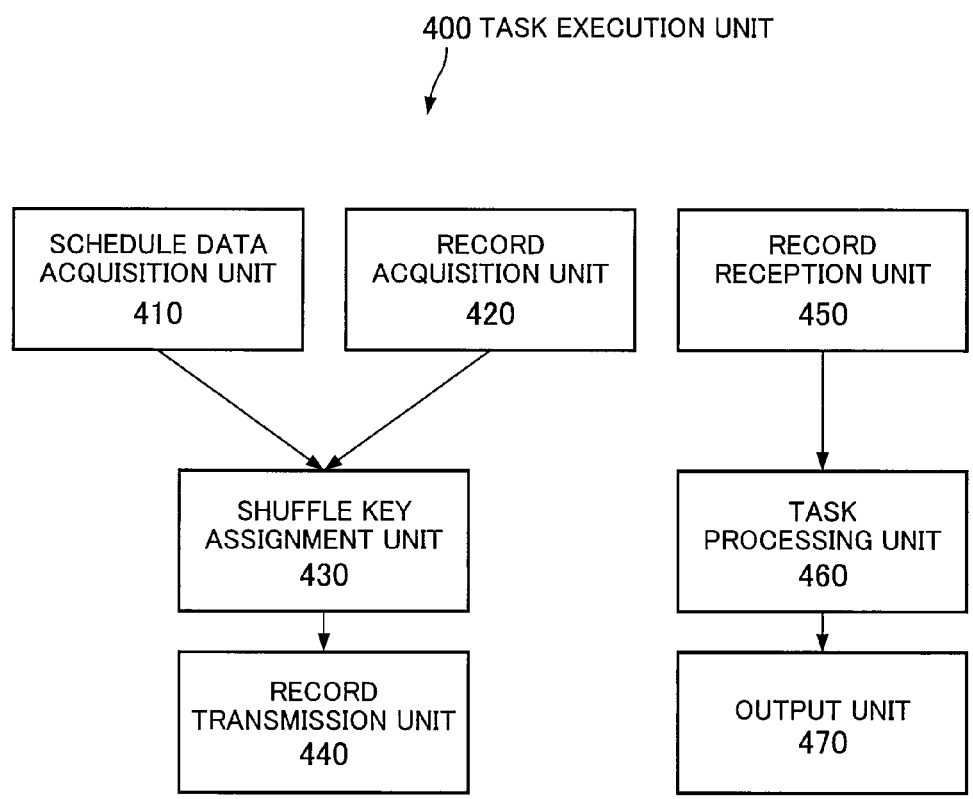
FIG. 34 is a block diagram of a task execution unit 400 according to a ninth exemplary embodiment of the present invention.

FIG. 34 is a block diagram showing a configuration of the task execution unit 400 shown in FIG. 33. As shown in FIG. 34, the task execution unit 400 according to the ninth exemplary embodiment includes a schedule data acquisition unit 410, a record acquisition unit 420, a shuffle key assignment unit 430, a record transmission unit 440, a record reception unit 450, a task processing unit 460, and an output unit 470.

The schedule data acquisition unit 410 acquires the schedule data outputted by the schedule unit 100. The record acquisition unit 420 acquires the record stored in the data storage unit 500 located in the neighborhood of the task execution unit 400 irrespective of the schedule data. The shuffle key assignment unit 430 assigns a shuffle key based on the schedule data to the record acquired by the record acquisition unit 420. The record transmission unit 440 transmits the record to the record reception unit 450 of another task processing unit 400 on the basis of the shuffle key assigned to the record.

The record reception unit 450 receives the record to which the shuffle key is assigned from the another task processing unit 400. The task processing unit 460 performs the task to the record on the basis of the shuffle key assigned to the record. The output unit 470 outputs a result of the processing.

FIG. 35 is a figure for explaining an example of the shuffle key. The example shown in FIG. 35 is shown as an example for ease of understanding the explanation. Therefore, the shuffle key is not interpreted in a limited sense. The shuffle key shown in FIG. 35 corresponds to the schedule data shown in FIG. 29.

In the data processing system 1000 according to the ninth exemplary embodiment, each task execution unit 400 performs the task in a dictionary order of the shuffle key assigned to the distributed record. Accordingly, the shuffle key assignment unit 430 configures the shuffle key so that each task execution unit 400 performs each task in the scheduled order as follows.

The shuffle key assignment unit 430 gives a tag indicating the task type to the head of the record. At this time, the tag is determined so that the record to the sub task is positioned in front of the record to the task other than the sub task in a dictionary order. In an example shown in FIG. 35, a value of "0" is given in the task type column when the record is the record to the sub task and a value of "1" is given in the task type column when the task is the task that is not divided. The tag is determined in this manner. Therefore, the sub task is performed before the task that is not divided is performed.

The shuffle key assignment unit 430 gives the tag representing the priority of the execution to the record. In an example shown in FIG. 35, smaller priority value means higher priority. This information may be given to only the task whose processing time is large. This is because the number of the tasks whose processing time is small tends to be large and the order of the execution of them has little influence.

The shuffle key assignment unit 430 gives the tag indicating the task identifier to the record. At this time, the task identifier of the sub task is numbered as "A-1", "A-2", "A-3", ... up to "A-N". For example, a rule in which the task execution unit 400 to which the sub task whose task ID is "A-1" is assigned takes charge of the corresponding serial processing task may be set in advance.

In an example shown in FIG. 35, the tag for identifying the task execution unit 400 that is the assignment destination is given to the shuffle key itself. However, the shuffle key may not necessarily have such configuration. For example, the record transmission unit 440 may determine the task execution unit 400 to which the record is transmitted by referring to the value of the attribute (branch office name) which determines the unit in which the serial processing is performed. The record transmission unit 440 may determine the task execution unit 400 to which the record is transmitted by using information such as the statistical information of the record or the like.

The task processing unit 450 may perform the record for each task identifier unit in a dictionary order of the shuffle key.

Next, the task execution unit 400 which takes charge of the serial processing task determines whether or not the corresponding sub task is completed. A method of determination will be explained. For example, a method in which the task execution unit 400 confirms whether or not an intermediate file whose name includes the task identifier is generated may be used. As another method, for example, a method in which a master server for managing a progress state of the task is introduced in the data processing system 1000 may be used. The task execution unit 400 which takes charge of the serial processing task may recognize the progress of the sub task performed by another task execution unit 400, appropriately acquire the intermediate data required for the calculation, and perform the serial processing task by using for example, the above-mentioned method.

As described above, by using the data processing system 1000 according to the ninth exemplary embodiment, the data processing system which operates on the distributed parallel execution platform and optimizes the processing time of the whole data processing including the parallel processing and the serial processing, the data processing method, and the program can be provided.

The table described in the exemplary embodiment of the invention corresponds to a data set described in the claims. The task execution unit 200 or the task execution unit 400 described in the exemplary embodiment of the invention corresponds to a computer described in the claims.

This application claims priority based on Japanese Patent Application No. 2012-239782 filed on Oct. 31, 2012, the disclosure of which is hereby incorporated by reference in its entirety.

INDUSTRIAL APPLICABILITY

As an example of the utilization of the present invention, the present invention can be applied to increase the speed of a batch processing of a mission critical system of a company.

REFERENCE SIGNS LIST

1 CPU
2 RAM
3 HDD
4 communication interface
5 input device
6 output device
10 task division unit
20 assignment unit
21 assignment unit
30 job reception unit
31 job reception unit
40 job division unit
41 job division unit
100 schedule unit
110 record information collection unit
200A to 200N task execution unit
210 schedule data acquisition unit
220 task processing unit
230 progress sharing unit
240 output unit
300 data storage unit
400A to 400N task execution unit
410 schedule data acquisition unit
420 record acquisition unit
430 shuffle key assignment unit
440 record transmission unit
450 record reception unit
460 task processing unit
470 output unit
500A to 500N data storage unit
1000 data processing system

The invention claimed is:

1. A data processing system comprising:
hardware, including a processor and memory;
a task dividing unit implemented by the hardware for receiving a plurality of tasks in each of which data processing, including a parallel processing that can be performed by a plurality of computers in parallel and a serial processing that is a post-processing of the parallel processing and performed by one computer, is performed to a record set that is a set of a plurality of records, and
for dividing the parallel processing that is a preprocessing of the serial processing to which an expected processing time thereof is greater than that of the serial processing included in another task into a plurality of sub tasks by subdividing the record set that is a processing target of the parallel processing; and
an assignment unit implemented by the hardware for assigning the plurality of the sub tasks to the plurality of the computers so that the plurality of the sub tasks are performed before a task other than the task including the parallel processing is performed,
wherein when an expected processing time of a task in the plurality of tasks is longer than an expected processing time of the serial processing with the longest processing time, the parallel processing included in the task is then divided.

2. The data processing system described in claim 1 further comprising:
   a job reception unit implemented by the hardware for receiving a job in which the data processing is performed to the data set that is the set of a plurality of records; and
   a job division unit implemented by the hardware for dividing the job into the plurality of tasks by subdividing the data set that is a processing target of the job into a plurality of record sets, wherein the task dividing unit receives the plurality of the divided tasks.

3. The data processing system described in claim 1, wherein the task dividing unit divides the parallel processing so as to differentiate the number of the records processed by each of the sub tasks, and
   wherein the assignment unit assigns a sub task of which the number of the records processed therein is greater than the number of the records processed in another sub task to a computer to which the serial processing is assigned.

4. The data processing system described in claim 1, wherein the assignment unit assigns a sub task for processing a first record in the serial processing to the computer to which the serial processing is assigned.

5. The data processing system described in claim 1, wherein the assignment unit outputs schedule data in which an assigned computer is associated with a priority to each of the tasks and sub tasks, and the serial processing that is the post-processing of the sub tasks, wherein the assigned computer includes:
   a schedule data acquisition unit executing on the assigned computer for acquiring the schedule data, and
   a task processing unit executing on the assigned computer for performing an assigned task in a decreasing order of the priority included in the schedule data; and when the assigned task has already been performed and when another task assigned to another computer has not been performed, the task processing unit performs the task assigned to the other computer.

6. The data processing system described in claim 1, wherein the assignment unit outputs schedule data in which an assigned computer is associated with a record that is the processing target to each of the tasks and sub tasks, and the serial processing that is the post-processing of the sub tasks, and wherein the assigned computer includes:
   a record acquisition unit executing on the assigned computer for acquiring the record,
   a schedule data acquisition unit executing on the assigned computer for acquiring the schedule data, and
   a record transmission unit executing on the assigned computer for transmitting the acquired record to another assigned computer.

7. A data processing method including:
   a division step in which a plurality of tasks in each of which data processing, including a parallel processing that can be performed by a plurality of computers in parallel and a serial processing that is a post-processing of the parallel processing and performed by one computer, is performed to a record set that is a set of a plurality of records are received, and the parallel processing that is a preprocessing of the serial processing to which an expected processing time thereof is greater than that of the serial processing included in another task is divided into a plurality of sub tasks by subdividing the record set that is a processing target of the parallel processing; and
   an assignment step in which the plurality of the sub tasks are assigned to the plurality of the computers so that the plurality of the sub tasks are performed before a task other than the task including the parallel processing is performed,
   wherein when an expected processing time of a task in the plurality of tasks is longer than an expected processing time of the serial processing with the longest processing time, the parallel processing included in the task is then divided.

8. A non-transitory computer readable medium storing a program that causes a computer serving as an data processing system to execute a process to:
   perform a division process in which a plurality of tasks in each of which a data processing, including a parallel processing that can be performed by a plurality of computers in parallel and a serial processing that is a post-processing of the parallel processing and performed by one computer, is performed to a record set that is a set of a plurality of records are received, and the parallel processing that is a preprocessing of the serial processing to which an expected processing time thereof is greater than that of the serial processing included in another task is divided into a plurality of sub tasks by subdividing the record set that is a processing target of the parallel processing; and
   an assignment process in which the plurality of the sub tasks are assigned to the plurality of the computers so that the plurality of the sub tasks are performed before a task other than the task including the parallel processing is performed,
   wherein when an expected processing time of a task in the plurality of tasks is longer than an expected processing time of the serial processing with the longest processing time, the parallel processing included in the task is then divided.

* * * * *